(12) United States Patent
Hahn et al.

(10) Patent No.: US 8,826,011 B2
(45) Date of Patent: *Sep. 2, 2014

(54) METHOD OF ENCRYPTING CONTROL SIGNALING

(75) Inventors: Gene Beck Hahn, Gyeonggi-do (KR); Ki Seon Ryu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 25 days.

This patent is subject to a terminal disclaimer.

(21) Appl. No.: 12/994,820

(22) PCT Filed: May 29, 2009

(86) PCT No.: PCT/KR2009/002877
§ 371 (c)(1),
(2), (4) Date: Feb. 9, 2011

(87) PCT Pub. No.: WO2009/145587
PCT Pub. Date: Dec. 3, 2009

(65) Prior Publication Data
US 2011/0154029 A1 Jun. 23, 2011

Related U.S. Application Data

(60) Provisional application No. 61/097,545, filed on Sep. 17, 2008.

(30) Foreign Application Priority Data

May 29, 2008 (KR) .......................... 10-2008-0050207
Mar. 2, 2009 (KR) .......................... 10-2009-0017463

(51) Int. Cl.
*H04L 29/06* (2006.01)
*H04L 9/32* (2006.01)
*H04W 12/10* (2009.01)
*H04L 9/08* (2006.01)
*H04W 92/10* (2009.01)
*H04W 12/04* (2009.01)

(52) U.S. Cl.
CPC ............. *H04L 9/3242* (2013.01); *H04W 12/10* (2013.01); *H04L 9/0822* (2013.01); *H04W 92/10* (2013.01); *H04L 2209/80* (2013.01); *H04W 12/04* (2013.01)
USPC ........................... 713/160; 713/166; 380/270

(58) Field of Classification Search
CPC . H04L 9/0822; H04L 9/3242; H04L 2209/80; H04W 12/10; H04W 92/10; H04W 12/04
See application file for complete search history.

(56) References Cited

U.S. PATENT DOCUMENTS 5,652,796 A 7/1997 Barraza et al.
6,459,687 B1 * 10/2002 Bourlas et al. ................ 370/328

(Continued)

FOREIGN PATENT DOCUMENTS

| CN | 1937494 A | 3/2007 |
| JP | 2005-509384 A | 4/2005 |
| JP | 2008-190038 A | 8/2008 |

OTHER PUBLICATIONS

Christos Xenakis, Lazaros Merakos, "Security in Third Generation Mobile Networks," Dec. 2003, Communications Networks Laboratory, University of Athens, pp. 641-644.*

(Continued)

*Primary Examiner* — Kaveh Abrishamkar
*Assistant Examiner* — James J Wilcox
(74) *Attorney, Agent, or Firm* — Birch, Stewart, Kolasch & Birch, LLP

(57) ABSTRACT

A method and device for selectively protecting a control signal. The method includes: configuring, at a transmission end, a header comprising indication information representing whether the control signal is encrypted; performing, at the transmitting end, protection of the control signal by selecting one of schemes for protecting the control signal; and transmitting, by the transmission end to the reception end, the control signal comprising the header. The schemes for protecting the control signal include: a first scheme that protects confidentiality and integrity of the control signal, a second scheme that protects only the integrity of the control signal, and a third scheme providing no protection of the control signal.

16 Claims, 13 Drawing Sheets

(56) References Cited

U.S. PATENT DOCUMENTS

| | | |
|---|---|---|
| 8,452,964 B2* | 5/2013 | Hahn .......................... 713/171 |
| 2002/0048364 A1* | 4/2002 | Gligor et al. .................... 380/37 |
| 2003/0088769 A1 | 5/2003 | Quick, Jr. et al. |
| 2003/0172109 A1* | 9/2003 | Dalton et al. ................. 709/203 |
| 2003/0177267 A1* | 9/2003 | Orava et al. .................. 709/245 |
| 2004/0107344 A1 | 6/2004 | Minemura et al. |
| 2005/0003806 A1* | 1/2005 | Bazin et al. ................ 455/414.2 |
| 2005/0050340 A1 | 3/2005 | Lee |
| 2005/0050352 A1* | 3/2005 | Narayanaswami et al. ... 713/201 |
| 2005/0192011 A1* | 9/2005 | Hong et al. ................... 455/440 |
| 2005/0201416 A1* | 9/2005 | Chang et al. ................. 370/469 |
| 2005/0208940 A1* | 9/2005 | Takase et al. .............. 455/435.1 |
| 2006/0153375 A1* | 7/2006 | Yi .................................... 380/44 |
| 2007/0010237 A1* | 1/2007 | Jones et al. ................ 455/422.1 |
| 2007/0198853 A1* | 8/2007 | Rees ............................. 713/189 |
| 2008/0072073 A1 | 3/2008 | Yang |
| 2008/0080409 A1* | 4/2008 | Zhang et al. ................. 370/315 |
| 2008/0178994 A1 | 7/2008 | Qi et al. |

OTHER PUBLICATIONS

Michel Barbeau, "WiMax/802.16 Threat Analysis." In: ACM Workshop on QoS and Security for Wireless and Mobile Networks, Oct. 13, 2005, Montreal, Quebec, Canada, pp. 1-8.*

Baba, "Mastering IPSec. second version," O'Reilly, Japan, Aug. 18, 2006, pp. 30-39 and pp. 137-140.

Kyas, "Mobile WiMax for Networks with Enhanced Security and Reliability Requirements," Proceedings of the Military Communications Conference, Oct. 29-31, 2007, Orlando, Florida, Tektronix Apr. 2007, (5 pages).

Nasreldin et al., "WiMax Security," 22nd International Conference on Advanced Information Networking and Applications—Workshops, IEEE Computer Society, Gino-wan, Okinawa, Japan, Mar. 25-28, 2008, (7 pages).

Menezes et al., "Handbook of Applied Cryptography," CRC Press, 1997, pp. 364-368 (7 pages provided).

* cited by examiner

METHOD OF ENCRYPTING CONTROL SIGNALING

CROSS REFERENCE TO RELATED APPLICATIONS

This application is a National Phase of PCT/KR2009/002877 filed on May 29, 2009, which claims priority under 35 USC 119(e) to U.S. Provisional Application No. 61/097,545 filed Sep. 17, 2008 and under 35 USC 119(a) to Patent Application Nos. 10-2008-0050207 filed in Republic of Korea, on May 29, 2008 and 10-2009-0017463 filed in Republic of Korea, on Mar. 2, 2009, all of which are hereby expressly incorporated by reference into the present application.

TECHNICAL FIELD

The present invention relates to a method of encrypting signals used for a wireless access system, and more particularly, to an encrypting method for protecting control signaling transmitted and received between a mobile station and a base station.

BACKGROUND ART

Hereinafter, a security sublayer used for a broadband wireless access system is briefly explained in the following description.

A security service provides confidentiality (security) and integrity for network data. Integrity means that specific information can be accessed or modified by an authorized user only in data and network security. In particular, the integrity secures a message not to be randomly modified by a third party or the like. And, confidentiality means that specific information is opened to authorized persons only. That is, the confidentiality perfectly protects contents of transferred data to prevent an unauthorized person from accessing contents of information.

Security sublayer provides security, authentication and confidentiality in a broadband wireless network. The security sublayer is able to apply an encryption function to a medium access control protocol data unit (MAC PDU) transferred between a mobile station and a base station. Therefore, the base station or the mobile station is able to provide a powerful defense capability against a service theft attack of an illegal user.

Base station performs encryption on a service flow across a network to prevent a data transfer service from an unauthorized access. Security sublayer controls a base station to distribute key-related informations to a mobile station using a key management protocol of an authenticated client/server structure. In doing so, it is able to further reinforce a function of a basic security mechanism by adding digital certificate based mobile station device authentication to the key management protocol.

While a basic function negotiation is in progress between a base station and a mobile station, if the mobile station does not provide a security function, authentication and key exchange procedures are skipped. Moreover, even if a specific mobile station is registered as a mobile station incapable of supporting an authentication function, a base station is able to regard that authority of the mobile station is verified. If a specific mobile station fails to support a security function, a service is not provided to a corresponding mobile station. Hence, a key exchange or a data encryption function is not performed.

Security sublayer consists of an encapsulation protocol and a privacy key management (PKM) protocol. The encapsulation protocol is the protocol for security of packet data in a broadband wireless network. The encapsulation protocol provides a set of cryptographic suites such as data encryption and data authentication algorithm and a method of applying such algorithm to a MAC PDU payload. The PKM protocol is the protocol or providing a method of safely distributing key relevant data to a mobile station from a base station. The base station and the mobile station are able to provide a method of safely distributing key relevant data using the PKM protocol. If a key management protocol is used, key relevant data can be shared between a mobile station and a base station. And, the base station is able to control a network access.

SUMMARY OF THE INVENTION

The present invention relates to a method of selectively protecting control signaling exchanged between a mobile station and a base station after an authorization phase performed in a broadband wireless access system.

The broadband wireless access system provides security for control signaling (control signal) using a message authentication code in general.

If the message authentication code is just used, integrity for a control signal can be secured. However, since a message is transparently sent, it is unable to secure confidentiality for the control signal.

Accordingly, the present invention is directed to a method of encrypting control signaling that substantially obviates one or more of the problems due to limitations and disadvantages of the related art.

An object of the present invention is to provide a method of effectively protecting data and control signals exchanged between a mobile station and a base station.

Another object of the present invention is to provide a method of solving security vulnerability of a control signal transmitted using a MAC message authentication code without an additional protection.

Another object of the present invention is to enable a mobile station or a base station to define a new control signal encryption key for protecting a controls signal after completion of an authorization phase.

Another object of the present invention is to provide a method of securing confidentiality for a control signal in a manner of selectively encrypting to exchange the control signal using a control signal encryption key.

Another object of the present invention is to enable a mobile station or a base station to use a general key (e.g. TEK) for protection of a control signal after completion of an authorization phase.

Another object of the present invention is to provide a method of securing confidentiality for a control signal in a manner of selectively encrypting to exchange the control signal using TEK.

Another object of the present invention is to provide a method of selectively protecting a control signal using an encryption control field (EC, EKS, etc.) defined in a medium access control (MAC) header.

Another object of the present invention is to provide a method of selectively protecting a control signal using an encryption control filed and/or a flow identifier.

A further object of the present invention is to provide a method of selectively protecting a management message using an encryption control field defined as one of controls signals in a header included in a management message.

In this disclosure, methods of protecting control signaling transceived between a mobile station and a base station in a wireless access system are disclosed.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of encrypting the control signal according to a first embodiment of the present invention includes the steps of receiving a message requesting a control signal encryption key for encrypting the control signal from a subscriber station, sending a response message including the control signal encryption key to the subscriber station, and encrypting the control signal using the control signal encryption key.

Preferably, prior to the request message receiving step, the method further includes the steps of performing an authorization phase with the subscriber station, generating an authentication key for the subscriber station via the authorization phase, and generating at least one of a key encryption key (KEK) and a group key encryption key (GKEK) using the authentication key.

More preferably, the control signal encryption key is generated using the authentication key (AK) and the control signal encryption key is encrypted using the key encryption key (KEK).

More preferably, the method further includes the step of broadcasting a message including a group control signal encryption key for encrypting multicast and broadcast control signals.

In this case, the group control signal encryption key is generated using the authentication key (AK) and the group control signal encryption key is encrypted using the group key encryption key (GKEK).

Preferably, the control signal encrypting step further includes a first step of encrypting a payload of the control signal using a control signal encryption key and a second step of appending a message integrity code or an integrity check value (ICV) for the encrypted payload and a header.

Preferably, the control signal encrypting step further includes a first step of appending a message integrity code or an integrity check value (ICV) for an encrypted payload and a header and a second step of encrypting a payload of the control signal using a control signal encryption key.

To further achieve these and other advantages and in accordance with the purpose of the present invention, a method of decrypting a control signal according to a second embodiment of the present invention includes the steps of sending a request message for obtaining a control signal encryption key necessary to decrypt the control signal to a base station, receiving a response message including the control signal encryption key, receiving the control signal encrypted with the control signal encryption key, and decrypting the control signal with the control signal encryption key.

Preferably, prior to the request message sending step, the method further includes the step of performing an authorization phase with the base station.

More preferably, the control signal encryption key is generated using an authentication key generated from the authorization phase. And, the control signal encryption key is encrypted using a key encryption key generated using the authentication key.

To further achieve these and other advantages and in accordance with the purpose of the present invention, in encrypting a control signal selectively, a method of encrypting the control signal according to a third embodiment of the present invention includes the steps of sending a first message containing a first security negotiation parameter supported by a mobile station to a base station, receiving a second message containing a second security negotiation parameter supported by the base station, and receiving the control signal selectively encrypted according to the second security negotiation parameter from the base station. In this case, indication information indicating whether the control signal is encrypted is included in a header of the control signal.

Preferably, the indication information includes an encryption control (EC) field indicating whether the control signal is encrypted.

More preferably, the indication information further includes an encryption key sequence (EKS) indicating at least one of an encryption level of the control signal and a sequence of confidentiality protection and integrity protection for the control signal.

Preferably, the first security negotiation parameter includes a first message confidentiality mode field supportable by the mobile station and the second security negotiation parameter includes a second message confidentiality mode field supportable by the mobile station and the base station.

More preferably, the method further includes the step of performing an authorization phase with the base station. In this case, the selectively encrypted control signal can be transmitted after completion of the authorization phase. In particular, confidentiality for the control signal is enabled through a TEK generated from a result of the completion of the authorization phase. In this case, the selectively encrypted control signal preferably includes the control signal of which integrity is protected using one of an ICV (integrity check value), a CMAC (cipher MAC) and a HAMC (hashed MAC).

To further achieve these and other advantages and in accordance with the purpose of the present invention, in encrypting a control signal selectively, a method of encrypting the control signal according to a fourth embodiment of the present invention includes the steps of receiving a first message containing a first security negotiation parameter supported by a mobile station from a the mobile station, sending a second message containing a second security negotiation parameter to the mobile station, selectively encrypting the control signal according to the second security negotiation parameter, and transmitting the selectively encrypted control signal to the mobile station. In this case, indication information indicating whether the control signal is encrypted can be included in a header of the control signal.

Preferably, the indication information includes an encryption control (EC) field indicating whether the control signal is encrypted.

More preferably, the indication information further includes an encryption key sequence (EKS) indicating at least one of an encryption level of the control signal and a sequence of confidentiality protection and integrity protection for the control signal.

Preferably, the first security negotiation parameter includes a first message confidentiality mode field supportable by the mobile station and the second security negotiation parameter includes a second message confidentiality mode field supportable by the mobile station and the base station.

More preferably, the method further includes the step of performing an authorization phase with the base station. In this case, the selectively encrypted control signal can be transmitted after completion of the authorization phase. In particular, confidentiality for the control signal is enabled through a TEK generated from a result of the completion of the authorization phase. In this case, the selectively encrypted control signal preferably includes the control signal of which integrity is protected using one of an ICV (integrity check value), a CMAC (cipher MAC) and a HAMC (hashed MAC).

More preferably, the control signal can be selectively encrypted using AES-CCM (advanced encryption standard-counter mode encryption mode with cipher block chaining message authentication code) algorithm or AES-CTR algorithm.

It is to be understood that both the foregoing general description and the following detailed description are exemplary and explanatory and are intended to provide further explanation of the invention as claimed.

Accordingly, the present invention provides the following effects and/or advantages.

First of all, the present invention effectively provides security for data and control signals.

Secondly, security confidentiality between a mobile station and a base station can be guaranteed by generating an additional security key in addition to a MAC message authentication code or encrypting control signaling via predefined TEK.

Thirdly, the present invention prevents security vulnerability that may damage covertness of a control signal, thereby enabling control signaling data to be safely transmitted.

Since a control signal enables various kinds of information to be shared between a mobile station and a base station, protection for the control signal should be provided. The present invention proposes a solution for the protection, thereby cutting off security threat attributed to an exposed control signal.

Fourthly, the present invention encrypts a specific one selected from control signals only instead of encrypting all control signals, thereby reducing an excessive load put on a whole network.

Fifthly, the present invention provides selective control signal encryption, thereby preventing security vulnerability that damages covertness due to transparent transmissions of control signals. And, the present invention enables selectively encrypted control signals to be safely transmitted.

A base station and/or a mobile station of the present invention selectively encrypt a control signal, thereby cutting off security threat generated from exposing a control signal to a third party in bad faith.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
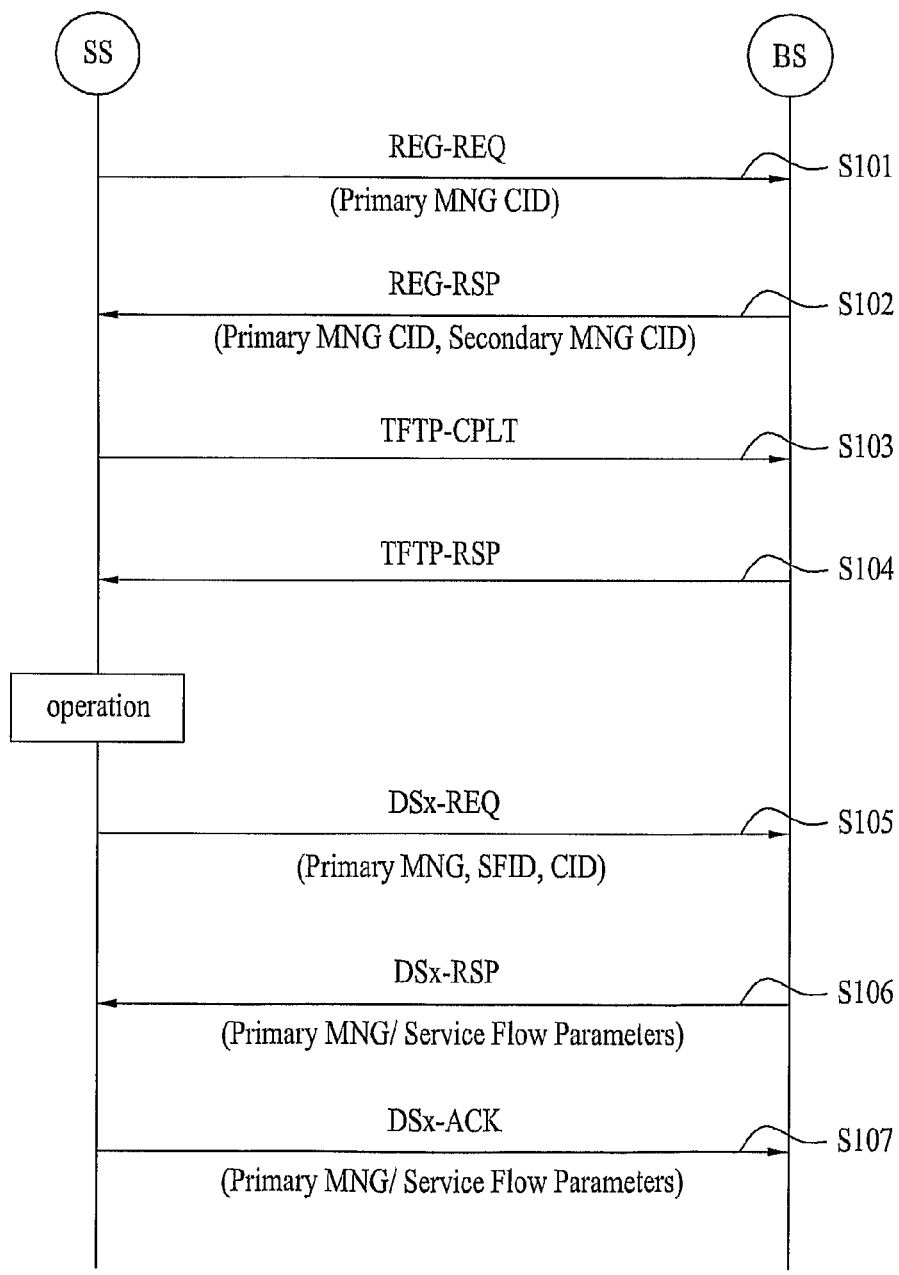
FIG. 1 is a diagram for a process for exchanging control signaling between a mobile station and a base station after completion of an initial ranging process.

Reference will now be made in detail to the preferred embodiments of the present invention, examples of which are illustrated in the accompanying drawings.

The present invention provides a method of selectively protecting control signaling transmitted and received between a mobile station and a base station in a wireless access system.

First of all, the following embodiments correspond to combinations of elements and features of the present invention in prescribed forms. And, it is able to consider that the respective elements or features are selective unless they are explicitly mentioned. Each of the elements or features can be implemented in a form to be uncombined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In this disclosure, embodiments of the present invention are mainly described with the data transmission/reception relations between a base station and a mobile station. In this case, the base station is meaningful as a terminal node of a network which directly performs communication with the mobile terminal. In this disclosure, a specific operation explained as performed by a base station can be performed by an upper node of the base station in some cases.

In particular, in a network constructed with a plurality of network nodes including a base station, it is apparent that various operations performed for communication with a mobile station can be performed by a base station or other networks except the base station. In this case, 'base station' can be replaced by such a terminology as a fixed station, a Node B, an eNode B (eNB), an advanced base station (ABS), an access point and the like. And, 'mobile station' can be replaced by such a terminology as a user equipment (UE), a mobile terminal, a terminal, an advanced mobile station (AMS), subscribe station (SS), a mobile subscriber station (MSS)' and the like.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

In the following description, specific terminologies are provided to help the understanding of the present invention. And, the use of the specific terminology can be modified into another form within the scope of the technical idea of the present invention. For instance, a control signal used for embodiments of the present invention can be replaced by such a terminology as a control message, a management message, a MAC control message, a MAC management message and the like.

Moreover, the accompanying drawings illustrate examples of technical ideas of the present invention and contain important steps or processes necessary to represent the technical ideas of the present invention. Yet, secondary steps or processes are omitted within the scope to avoid distorting the technical ideas of the present invention while the technical features of the present invention are clearly disclosed.

In a broadband wireless access system, after an authorization phase between a base station and a mobile station has been successfully completed, the base station and the mobile station are able to share an authorization key (hereinafter abbreviated AK) with each other. Each of the base station and the mobile station is able to generate a CMAC (cipher based MAC)/HMAC (hashed MAC) key, which identifies a presence or non-presence of forgery/modification of a control signal message and secures integrity, using the authorization key.

The mobile station is able to calculate a message authentication code (MAC) for control signaling exchanged with the base station using the CMAC/HMAC key. And, the mobile station is able to determine a presence or non-presence of forgery/modification of a message using the CMAC/HAMC key. Through this, integrity for the message can be secured.

For instance, a message authentication code (MAC), which is generated using CMAC/HAMC key, can be appended to each control signaling exchanged between a mobile station and a base station.

FIG. 1 is a diagram for a process for exchanging control signaling between a mobile station and a base station after completion of an initial ranging process.

Referring to FIG. 1, after completion of an authorization phase, a subscriber station (SS or MS) sends a registration request (REG-REQ) message including an initial MNG connection identifier to a base station (BS) [S101].

The BS sends a registration response (REG-RSP) message including a primary MNG connection identifier (primary MNG CID) and a secondary MNG connection identifier (secondary MNG CID) to the mobile subscriber station in response to the REG-REQ [S102].

In case of successfully receiving a configuration file from the base station, the subscriber station sends a TFIP-CPLT (config file TFTP complete) message to the base station. In this case, the TFTP-CPLT message is used to inform the base station that the subscriber station (or, MS) is ready to receive a service by completing initialization [S103].

The base station sends a TFTP-RSP message to the subscriber station in response to the TFTP-CLPT message [S104].

The subscriber station receives a service from the base station and then performs communication with the base station.

The subscriber station sends a DSx-REQ message comprising a primary MNG, SFID (service flow identifier) and connection identifier (CID) to the base station [S105].

The base station sends a DSx-RSP message containing a primary MNG and service flow parameters to the subscriber station [S106].

In order to acknowledge a normal reception of the DSx-RSP message, the subscriber station sends a DSx-ACK message containing a primary MNG and service flow parameters [S107].

Referring to FIG. 1, message integrity for control signals exchanged between the subscriber station and the base station can be secured through HMAC/CMAC. Although the use of HMAC/CMAC enables a determination of a presence or non-presence of message forgery/falsification, it fails to provide confidentiality of message. Hence, the function of message covertness is not secured.

Figure 2:
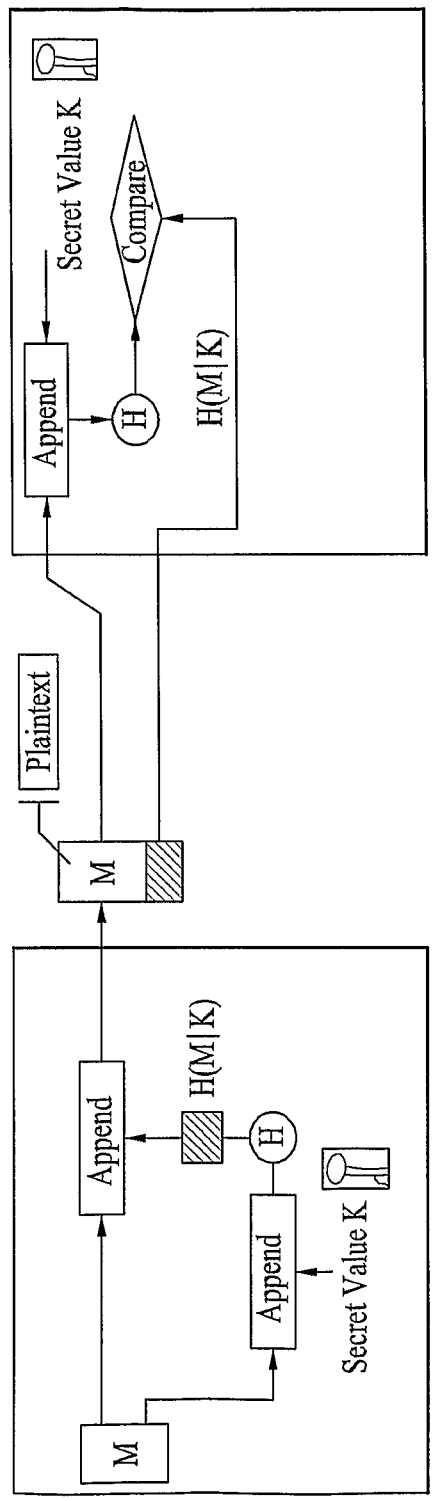
FIG. 2 is a diagram for an example of HMAC authentication function that uses a shared secret value.

FIG. 2 is a diagram for an example of HMAC authentication function that uses a shared secret value.

First of all, keyed hash, which uses a key included in HMAC-Digest Attribute and HMAC Tuple, is SHA-1 (or, FIPS 180-1). Namely, a mobile station and a base station use HMAC through secure Hash Algorithm. HMAC (hashed MAC) appends a shared secret value key to a value resulting from encrypting a hashed result value or a message, attaches a corresponding hashed value to the message, and then sends the corresponding message. Therefore, user authentication can be supported by checking that the same key is used for both parties, as well as message authentication.

Referring to FIG. 2, in RFC 2104, after a shared secret value has been attached to a message, a corresponding result of the attachment can be hashed. That is, a secret value derived from a shared secret value key is appended to a message, a hashed value of the corresponding result is attached to a message, and the message is then sent. Therefore, it is able to enhance both security and processing speed.

Figure 3:
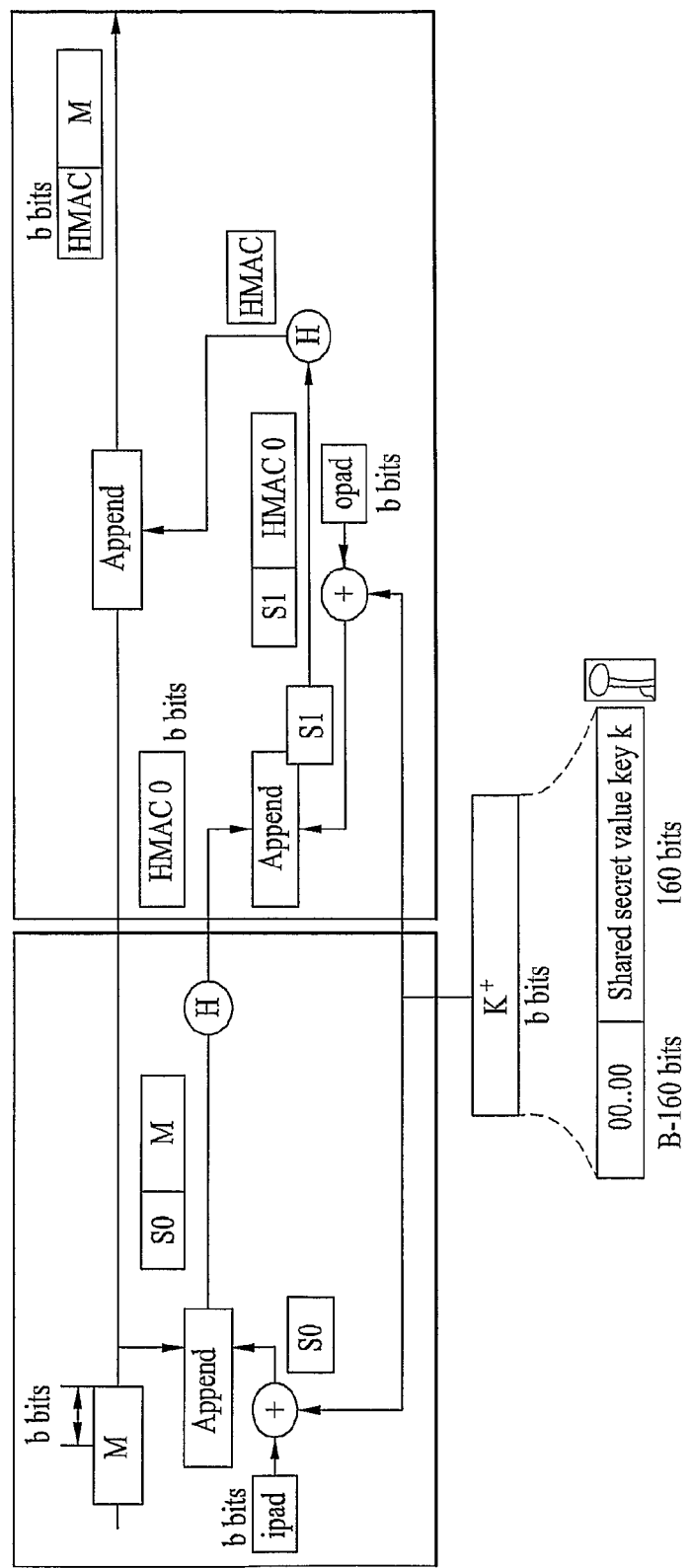
FIG. 3 is a diagram for the standard HMAC authentication process of RFC 2104.

FIG. 3 is a diagram for the standard HMAC authentication process of RFC 2104.

Referring to FIG. 3, a standard HMAC performs a hash process on a message and a secret value key twice.

A first hash process is explained as follows. First of all, a message M to be sent is divided by a random b-bit unit. Subsequently, a shared secret value key $K^+$ is generated by adding a prescribed number of bit '0' to enable a length of a shared secret value key K to become b-bit. $H(M\|S0)$ is then found by hashing with a result (S0) resulting from performing EXOR (exclusive OR) operation on a value of 'ipad(-00110110)'.

A second hash process is explained as follows. First of all, a value of H(H(M‖S0)‖S1), which is a final HMAC code, is obtained by hashing the first hash result value and S1 which is an EXOR result value of 'opad (01011010)' value and the shared secret value key $K^+$.

If a transmitting side attaches the results of the two hash processes to a message and then sends the message, a receiving side is able to perform message and user authentication by comparing the received results with a result of calculation by the same method.

Meanwhile, Keyed Hash, which uses CMAC digest attribute and a key included in CMAC Tuple, uses CMAC algorithm of AES (advanced encryption standard). Calculation of CMAC digest includes a field constructed with AKID (authorization key ID), 16-bit CID associated with a transmission of CMAC_PN (unsigned 32 bit number) message, and 16-bit '0' padding and MAC management message. Least significant bits (LSBs) of the CMAC digest are truncated to generate a 64-bit digest.

Figure 4:
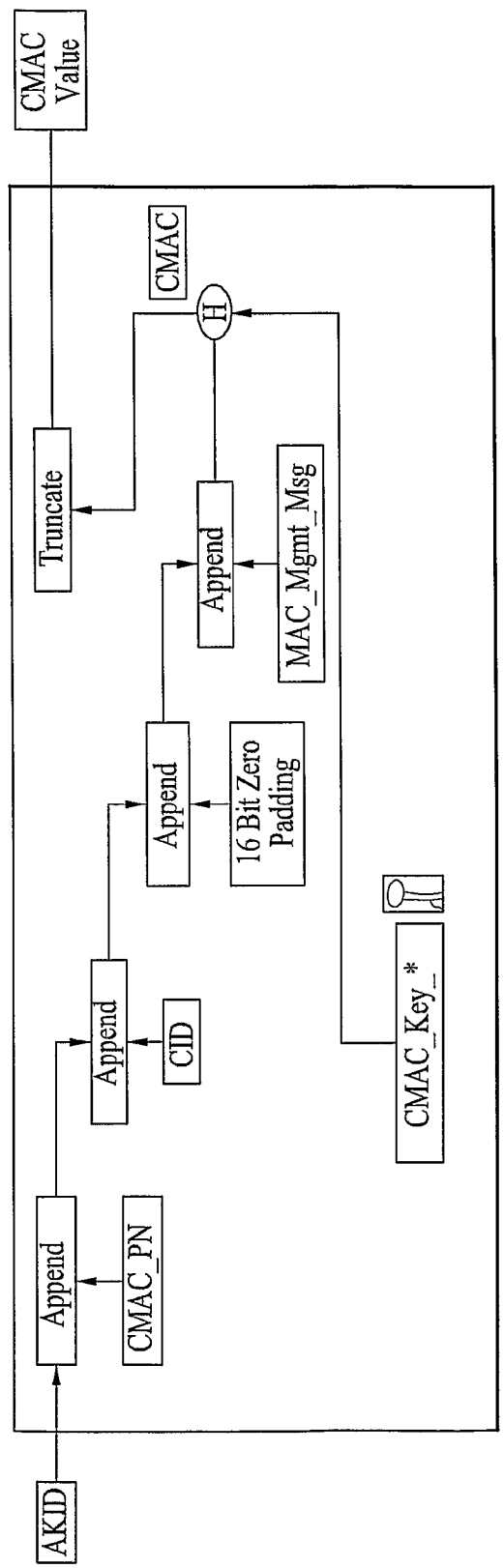
FIG. 4 is a diagram for an example of CMAC generating procedure.

FIG. 4 is a diagram for an example of CMAC generating procedure.

Referring to FIG. 4, CMAC is generated by adding CMAC_PN, CID, 16-bit zero padding and MAC management message (MAC_Mgmt_Msg) to an authorization key identifier (AKID) and hashing it with a CMAC key (CMAC_Key). Subsequently, it is able to find a CAMC value by truncating a prescribed portion of the hashed CMAC.

Referring to FIGS. 1 to 4, covertness protection for control signals exchanged between a mobile station and a base station is not performed after the authorization phase. Since a control signal is transmitted by having CMAC/HMAC appended thereto only, security may become vulnerable and security threats against various services, which will be provided in the future, may take place. Therefore, embodiments of the present invention provide a method of maintaining confidentiality by selectively encrypting control signals exchanged between a mobile station and a network (i.e., a method of preventing external exposure).

<Control Signal Encryption Using New Encryption Key>

Data confidentiality means that data is protected from unauthorized exposure. Confidentiality can be secured through data encryption. Encryption means that data exchanged between a sender and a receiver is transformed into a format a third party is unable to identify. And, encryption algorithm and encryption key are necessary to perform the encryption.

According to an embodiment of the present invention, disclosed is a method of securing data confidentiality for preventing control signaling from being exposed by considering data integrity through addition of a message authentication code for the control signaling exchanged between a mobile station and a base station. And, an encrypting method for preventing excessive load from being put on a wireless access network is proposed. Therefore, according to the present invention, disclosed is a method of preventing confidentiality of control signaling from being damaged in a manner that a mobile station and/or base station generates to use a separate key for encryption of the control signaling after completion of an authorization phase.

In the following description, explained is a method of generating additional keys and encrypting to exchange control signals using the additional keys in a mobile station and a base station.

First, a base station generates an authorization key through an authorization phase with a mobile station. Subsequently, the base station generates a control signaling encryption key (CSEK) using the authorization key (AK) and is then able to encrypt the control signaling using the CSEK. The control signaling encryption proposed by the present invention is valid after an authorization phase has been completed. Therefore, communications can be performed more safely together with message integrity security attributed to a message authentication code addition.

According to embodiments of the present invention, TEK or CSEK is used to secure confidentiality for control signaling after an authorization phase. For instance, it is able to use TEK previously defined for PKM attribute type in IEEE 802.16 which is one of wireless access systems. Alternatively, it is able to newly define a type and attribute value for CSEK in PKM attribute type. And, it is understood that a security key of the present invention is applicable to parameters for security in other wireless access systems.

Table 1 shows an example of PKM attribute list available for embodiments of the present invention.

TABLE 1

| Type | PKM attribute |
|------|---------------|
| 0-5  | Reserved value |
| ...  | —             |
| 8    | TEK           |
| ...  | —             |
| 25   | CSEK          |
| ...  | —             |
| 28   | CSEK parameter |
| ...  | —             |

Table 2 shows an example of CSEK attribute format available for embodiments of the present invention.

TABLE 2

| type | length | Value |
|------|--------|-------|
|      | 8      | Encrypted CSEK for DES |
|      | 16     | Encrypted CSEK for AES |
|      | 24     | Encrypted CSEK for AES key Wrap |
|      | 128    | Encrypted CSEK for RSA |

Table 3 shows an example of CSEK encryption algorithm identifiers available for embodiments of the present invention.

TABLE 3

| value | contents |
|-------|----------|
| 0     | reserved |
| 1     | 3-DES EDE with 128-bit key |
| ...   | —        |
| 4     | AES Key Wrap with 128-bit key |
| 5-255 | reserved |

Referring to Tables 1 to 3, CSEK attribute includes a CSEK encryption key encrypted by a key encryption key (KEK) derived from an authorization key (AK) resulting from an authorization phase. In CSEK encryption algorithm, if a CSEK encryption algorithm identifier existing in security association (SA) is 0x01, a length of CSEK is 8 and the CSEK is encrypted in EDE mode through 3DES in a manner similar to that of TEK encryption procedure. Meanwhile, if a CSEK encryption algorithm identifier existing in security association (SA) is 0x03, a length of CSEK is 16 and the CSEK is encrypted in ECB mode using AES in a manner similar to that of TEK encryption procedure. If a CSEK encryption algorithm identifier existing in security association (SA) is 0x04, a length of CSEK is 24 and the CSEK can be encrypted by CSEK AES key wrap algorithm.

TABLE 4

| Type | length | value |
|---|---|---|
| 13 | variable | The compound field contains the sub-attributes. |

Table 5 shows an example of CSEK parameter sub-attribute available for embodiments of the present invention.

TABLE 5

| Attribute | Contents |
|---|---|
| CSEK | CSEK, Encrypted with the negotiated CSEK encryption algorithm. GCSEK, Encrypted with the GKEK. |
| Key-Lifetime | CSEK remaining Lifetime |
| Key-Sequence Number | CSEK Sequence Number |
| CBC-IV | Cipher Block Chaining Initialization Vector |
| Associate GKEK Sequence Number | Associated GKEK Sequence Number with this CSEK-Parameters |

Referring to Table 5, it is observed that a CSEK field is encrypted using CSEK encryption algorithm. And, it is also observed that GCSEK is encrypted using GKEK. And, Key-Lifetime field indicates a time for CSEK to exist. A key sequence number field indicates a CSEK sequence number. And, an associate GKEK sequence number field indicates a sequence number of GKEK associated with CSEK parameters.

Table 6 shows an example for a key-lifetime field format of CSEK available for embodiments of the present invention.

TABLE 6

| Type | Length | Value |
|---|---|---|
| 27.7 | 4 | CSEK Grace Time in Seconds |

Referring to Tables 4 to 6, a CSEK-parameters attribute is a compound attribute and is constructed with a series of sub-attributes. Sub-attributes indicate all security parameters related to CSEK generation of specific SAID.

In this case, GCSEK means CSEK for multicast/broadcast control signal. Namely, GCSEK (group CSEK) and GKEK are usable in encrypting a multicast/broadcast control signal.

Meanwhile, a CBC-IV attribute is necessary for a case that a control signal encryption algorithm identifier of a SA cipher suite is 0x01 (DES in BC mode) or 0x03 (AES in CBS mode). Yet, the CBC-IV attribute is not necessary for a case that a control signal encryption algorithm identifier of a SA cipher suite is 0x02 (AES).

Table 7 shows an example for new values of cryptographic suites applicable to embodiments of the present invention.

TABLE 7

| type | length | value |
|---|---|---|
| 20 | 3 | A 24-bit integer identifying the cryptographic suite properties, the most significant byte, as defined in table 562, indicates the encryption algorithm and key length. The upper middle byte, as lower middle byte, as defined in table 564, indicates the TEK Encryption Algorithm. The least significant byte, indicates the CSEK and/or TEK Encryption Algorithm. |

Table 8 shows an example for values of cryptographic suites allowable for embodiments of the present invention.

TABLE 8

| value | contents |
|---|---|
| 0x000000 | No data encryption, no data authentication, no key encryption. |
| 0x010001 | CBC mode 56-bit DES, no data authentication and 3-DES, 128 |
| 0x000002 | No Data encryption, no data authentication and RSA, 1024 |
| 0x010002 | CBC mode 56-bit DES, no data authentication and RSA, 1024 |
| 0x020003 | CCM mode AES, no data authentication and AES, 128 |
| 0x020103 | CCM mode 128 bit AES, CCM mode, 128 bit, ECB mode AES with 128 bit key |
| 0x020104 | CCM mode 128 bit AES, CCM mode, AES key wrap with 128 bit key |
| 0x030003 | CBC mode 128 bit AES, no data authentication, ECB mode AES with 128 bit key |
| 0x800003 | MBS CTR mode 128 bits AES, no data authentication, AES ECS mode with 128 bit key |
| 0x800004 | MBS CTR mode 128 bits AES, no data authentication, AES key wrap with 128 bit key |
| All remaining values | Reserved |

According to embodiments of the present invention, exchanges of control signals through encryption are selectively applicable to some of the control signals or can be forced to be applied to all control signals. In particular, the present invention enables safe delivery of MAC (medium access control) management message by securing confidentiality for control signaling.

Figure 5:
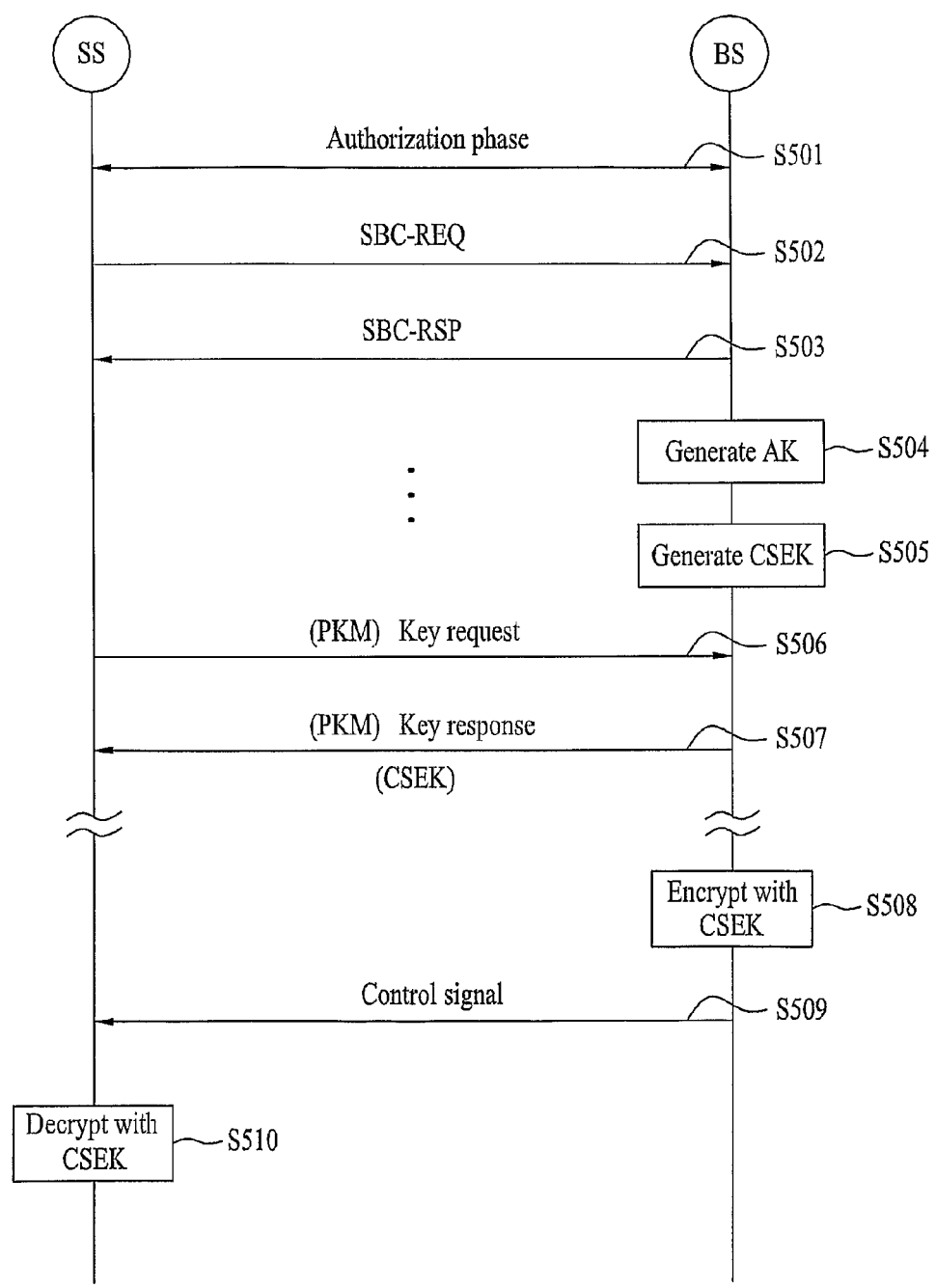
FIG. 5 is a diagram for a process for transmitting a control signal encrypted using CSEK according to a first embodiment of the present invention.

FIG. 5 is a diagram for a process for transmitting a control signal encrypted using CSEK according to a first embodiment of the present invention.

Referring to FIG. 5, a subscriber station (SS) performs an authorization phase with a base station in case of initially accessing the base station (BS) [S501].

After the authorization phase has been completed, the subscriber station sends an SBC-REQ (SS basic capability request) message, which informs basic capability of the subscriber station and makes a request for basic capability information of the base station, to the base station [S502].

In the step S502, the SBC-REQ message contains a basic CID of the subscriber station and parameters of TLV type. The TLV parameters can include a parameter of capabilities for construction and transmission of MAC PDUs, a security negotiation parameter, a service information query parameter, a visit NSP identifier, an MIH capability support parameter, an HAMC/CMAC Tuple parameter and the like.

The base station sends an SBC-RSP message to the subscriber station in response to the SBC-REQ message [S503].

In the SBC-RSP message, a CID of the subscriber station and a TLV encode attribute parameter can be included. And, in the SBC-RSP message, physical parameters supported by the base station, a parameter of bandwidth allocation support, a security negotiation parameter, an HMAC/CMAC Tuple parameter and the like can be included.

The subscriber station and the base station are able to negotiate encryption of control signals with each other through capability negotiation (for instance, exchanging the SBC-REQ message and the SBC-RSP message). In particular, the security negotiation parameter contained in the SBC-REQ/RSP message is able to support encryption of control signals.

Table 9 shows an example for security negotiation parameter format used for the step S502 or S503.

TABLE 9

| type | length | Value | region |
|------|--------|-------|--------|
| 25 | variable | the compound field contains the sub-attributes as defined in the table below | SBC-REQ, SBC-RSP |

Table 10 shows an example of security negotiation sub-attributes.

TABLE 10

| Attribute | Contents |
|-----------|----------|
| PKM Version Support | version of privacy sub-layer Supported |
| Authorization policy Support | Authorization policy to support |
| Message Authentication Code Mode | Message Authentication Code to support |
| Message Confidentiality Mode | message Confidentiality to support |
| PN Window size | size of capability of the receiver PN window per SAID |

Table 11 shows an example of a PKM version support type.

TABLE 11

| Type | Length | Value |
|------|--------|-------|
| 25.1 | 1 | Bit 0: PKM version 1 Bit 1: PKM version 2<br>Bit 2: PKM version 3<br>Bit 3-7: reserved, shall be set to zero |

Table 12 shows an example of a message confidentiality mode filed format.

TABLE 12

| Type | Length (byte) | value |
|------|---------------|-------|
| 25.5 | 1 | Bit 0: No message confidentiality<br>Bit 1: Mandatory message confidentiality<br>Bit 2: selective message confidentiality<br>Bit 3-7: reserved, shall be set to zero |

Referring to Tables 9 to 12, a message confidentiality mode filed clearly expresses a message confidentiality mode supported by a subscriber station. Therefore, a subscriber station and a base station are able to negotiate what kind of message confidentiality mode will be used and can use the negotiated message confidentiality mode.

If a bit value of a message confidentiality mode is set to '0', it indicates that no message confidentiality is supported. If a bit value of a message confidentiality mode is set to '1', it indicates that confidentiality for a corresponding message is supported. A subscriber station is able to support at least one or more message confidentiality modes and is able to inform a base station of all supportable message confidentiality modes via SBC-REQ message. Accordingly, the subscribe station and the base station are able to negotiate message confidentiality by exchanging the SBC-REQ/RSP messages.

Referring now to FIG. 5, the base station generates an authorization key (AK) after completion of the authorization phase [S504].

The base station is able to generate CSEK using the authorization key (AK) generated in the step S504. Moreover, the base station is able to generate KEK and is also able to encrypt CSEK using the KEK [S505].

Formula 1 indicates an example of a CSEK generating method.

$$CSEK <= Dot16KDF(KEK, Nonce, SSMAC\ Address|BSID|SAID|CSEK\ Counter|"CSEK", 128)$$ [Formula 1]

Referring to Formula 1, a CSEK counter is a 16-bit counter. The CSEK counter is incremented by 1 each time a base station generates a new CSEK. The base station is able to transmit the CSEK to a subscriber station. In this case, the CSEK of a unicast type can be transmitted to the subscriber station.

A generic MAC header (GMH), which is used for a wireless access system (e.g., IEEE 802.16xx), can be modified as Table 13 for the use of CSEK or GCSEK generated by a base station.

TABLE 13

| Name | Length | Contents |
|------|--------|----------|
| CI | 1 | CRC indicator.<br>1 = CRC is included in the PUD by appending it to the PDU payload after encryption, if any<br>0 = NO CRC is included. |
| CID | 16 | connection identifier |
| EC | 1 | Encryption control 0 = payload is not encrypted or payload is not included<br>1 = payload is encrypted |
| EKS | 2 | Encryption Key Sequence. The index of the {Traffic Encryption Key (TEK), initialization vector} pair or the {Control Signaling Encryption Key(CSEK), initialization vector} pair used to encrypt the payload. This field is only meaningful if the EC field is set to 1. |
| ESF | 1 | Encryption sub-header field.<br>If ESF = 0, the extended sub-header is absent.<br>If ESF = 1, the extended sub-header is present and will follow the generic MAC header immediately. The ESF is applicable both in the DL and in the UL. |
| HCS | 8 | Header check sequence. An 8-bit field used to detect errors in the header. The transmitter shall calculate the HAC value for the first five bytes of the cell header, and insert the result(modulo 2) by the generator polynomial $g(D = D^8 + D^2 + D + 1$ of the division multiplied by the content of the header excluding the HCS field.) |
| HT | 1 | Header Type. Shall be set to zero. |
| LEN | 11 | Length. The length in bytes of the MAC PDU including the MAC header and the CEC if present. |
| Type | 6 | This field indicates the sub-headers and special payload types present in the message payload. |

Referring to Table 13, an EKS (encryption key sequence) field among generic MAC header fields is able to include a TEK (traffic encryption key) for data encryption, an initialization vector index and a CSEK (control signaling encryption key) index for encryption for control signaling.

Referring now to FIG. 5, the subscriber station sends a key request message (PKMv2 key request) to the base station to obtain CSEK [S506]. In response to the key request message, the base station sends a key response message (PKMv2 key reply) containing the CSEK to the subscriber station [S507].

The base station may need to transmit control signals to the subscriber station. If so, the base station encrypts the control signals using the CSEK, thereby securing confidentiality of the control signaling as well as integrity thereof [S508].

In the step S508, the control signals can be variously encrypted using the CSEK.

The base station transmits the control signal, which was selectively encrypted using the CSEK, to the subscriber station [S509].

Finally, the subscriber station is able to decrypt the control signal, which was transmitted in the step S509, using the CSEK obtained in the step S507 [S510].

Figure 6:
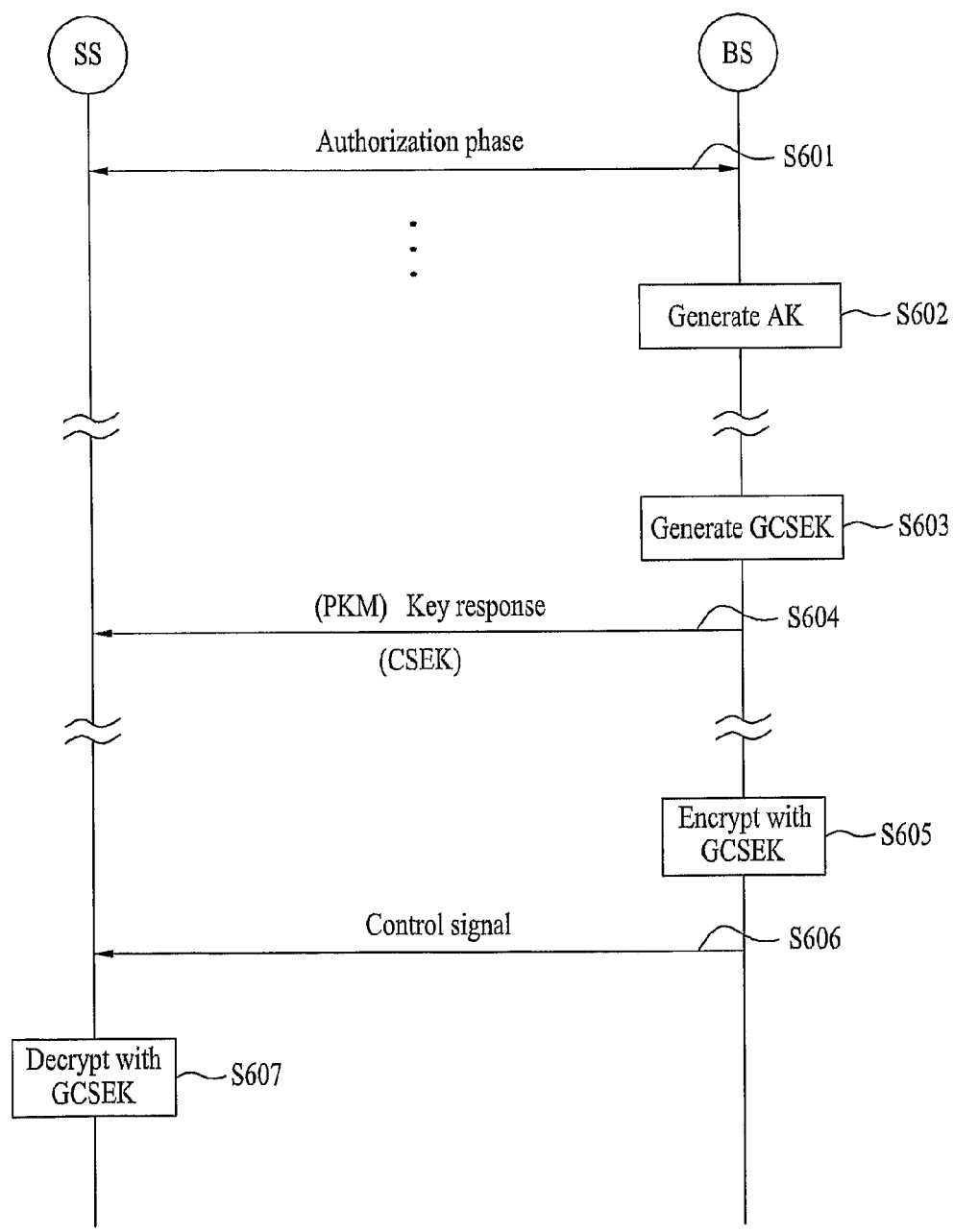
FIG. 6 is a diagram for a process for transmitting a control signal encrypted using GCSEK according to a first embodiment of the present invention.

FIG. 6 is a diagram for a process for transmitting a control signal encrypted using GCSEK according to a first embodiment of the present invention.

FIG. 6 relates to an encryption method. In this encryption method, a subscriber station enters an area of a base station, performs an authorization phase of a base station, and then encrypts broadcast and multicast control signals using GCSEK (group control signal encryption key). Preferably, another embodiment of the present invention is applicable after a subscriber station has obtained a CSEK from a base station.

Referring to FIG. 6, a subscriber station and a base station perform an authorization phase [S601] and the base station generates an authorization key (AK) [S602].

A process for generating a CSEK to be shared by both of the subscriber station and the base station can refer to FIG. 5.

The base station generates a GCSEK using the AK. Yet, in case that the GCSEK is encrypted, a GKEK (group key encryption key) is used instead of a KEK [S603].

According to another embodiment of the present invention, the GCSEK is provided to secure confidentiality for a broadcast/multicast control message for subscriber stations existing within a cell. Hence, in order to update the CSEK, which is obtained after the subscriber station has performs an initialization procedure with the base station, it is able to use the GSCEK.

The base station has the GCSEK contained in a key response (PKMv2 key reply) message and is then able to send the message in a broadcast form to subscriber stations included in a cell area of the base station [S604].

The base station is able to encrypt broadcast/multicast control signals using the GCSEK [S605].

The base station is able to broadcast the control signal encrypted with the GCSEK to the subscriber station [S605]. The subscriber station is able to decrypt the control signal using the GCSEK obtained in the step S604.

Figure 7:
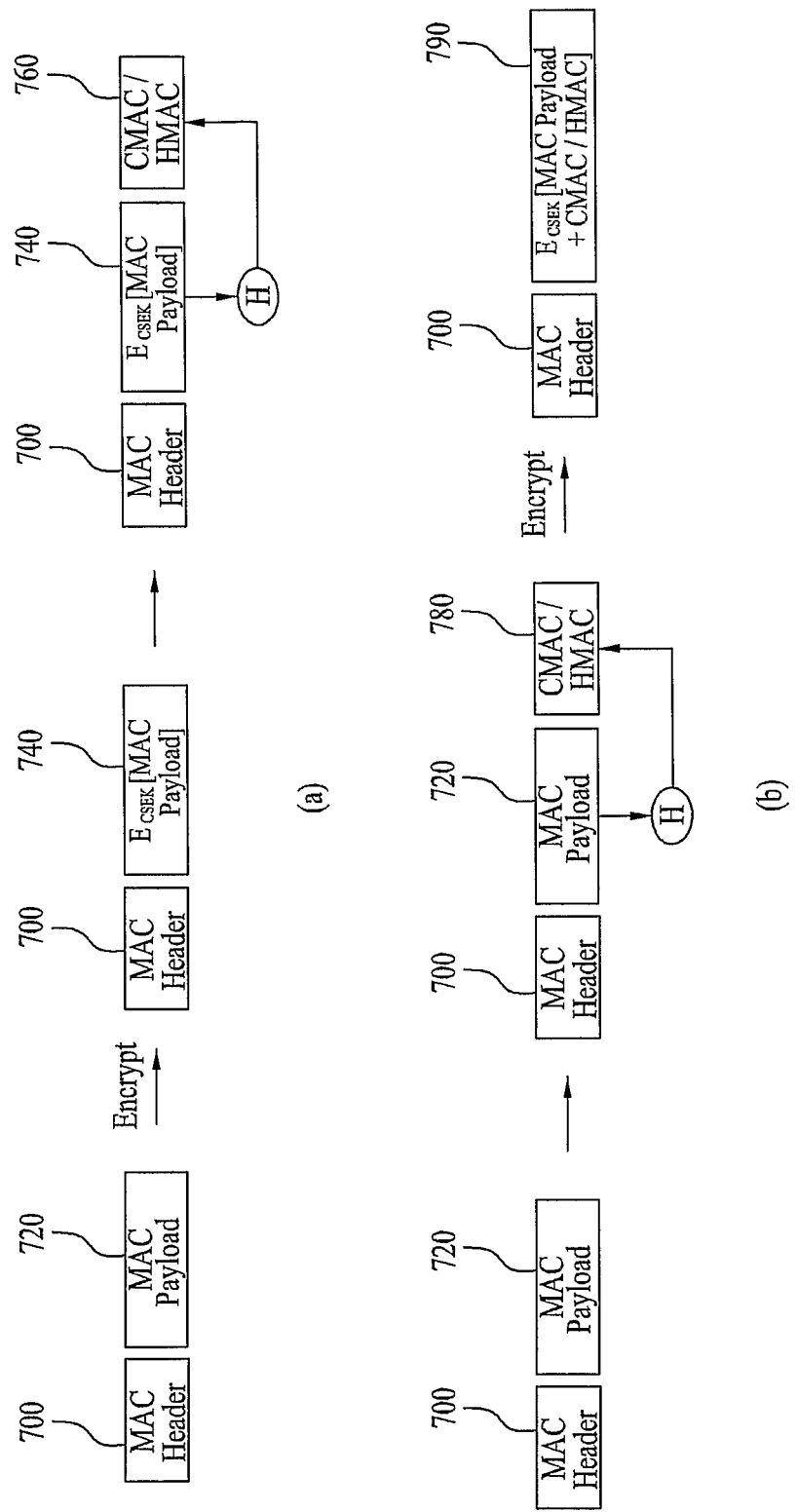
FIG. 7 is a diagram for CSEK encryption methods applicable to embodiments of the present invention.

FIG. 7 is a diagram for CSEK encryption methods applicable to embodiments of the present invention.

First, a base station generates a CSEK using an authorization key and is then able to encrypt the CSEK using a KEK. In doing so, the base station is able to encrypt control signals in two kinds of forms using the CSEK. Methods described with reference to FIG. 7 are applicable to the step S508 shown in FIG. 5 or the step S605 shown in FIG. 6.

In a first method of encrypting control signals, a payload of a control signal is encrypted, then CMAC/HMAC for the payload and a header is calculated, and lastly the calculated CMAC/HMAC is appended. In a second method of encrypting control signals, CMAC/HMAC for a control signal and a header is calculated, then the calculated CMAC/HMAC is appended, and lastly the CMAC/HMAC and a payload of the control signal are encrypted.

In (a) of FIG. 7, a first method of encrypting a control signal is shown. In (b) of FIG. 7, a second method of encrypting a control signal is shown. Various kinds of control signals can exist. Yet, in FIG. 7, the description is made by taking a MAC management message as one of the control signals. The MAC management message includes a MAC header 700 and a MAC payload 720.

Referring to (a) of FIG. 7, first of all, a base station encrypts a MAC payload 720 of a MAC management message with a CSEK 740. The base station generates a CMAC/HMAC 760 for the encrypted MAC payload 740 and a header and is then able to append the CMAC/HMAC 760.

A subscriber station receiving the control signal encrypted in a manner shown in (a) of FIG. 7 checks integrity of the control signal by checking the CMAC/HMAC and is then able to perform decryption on the encrypted control signal.

Referring to (b) of FIG. 7, first of all, a base station generates a CMAC/HMAC 780 for a MAC payload 720 contained in a MAC management message and a header and then appends it to the MAC management message. Subsequently, the base station is able to generate an encrypted MAC payload 790 by encrypting a payload of the MAC management message and the CMAC/HMAC with a CSEK.

A subscriber station receiving the control signal encrypted in a manner shown in (b) of FIG. 7 decrypts the encrypted control signaling and CMAC/HMAC value and is then able to check integrity of the control signaling by checking the CMAC/HMAC value of the control signaling.

In order to support the confidentiality guarantee of control signals used for embodiments of the present invention, it is preferable that formats of relevant MAC messages are modified.

For instance, in case of a MOB_BSHO-REQ message for handoff (or, handover), a handover authorization policy support parameter (e.g. HO_authorization_policy_support) preferably includes additional informations for control signaling.

Table 14 shows an example for a MOB_BSHO-REQ message format.

TABLE 14

| syntax | size (bit) | Contents |
| --- | --- | --- |
| HO_authorization_policy_support | 8 | Bit#0: RSA authorization<br>Bit#1: EAP authorization<br>Bit#2: reserved<br>Bit#3: HMAC supported<br>Bit#4: CMAC supported<br>Bit#5: 64-bit short-HMAC<br>Bit#6: 80-bit short-HMAC<br>Bit#7: 96-bit short-HMAC |

Table 15 shows an example for a MOB_BSHO-REQ message format modified to support encryption of control signaling.

TABLE 15

| syntax | bit | Contents |
| --- | --- | --- |
| HO_authorization_policy_support | 10 | Bit#0: RSA authorization<br>Bit#1: EAP authorization<br>Bit#2: reserved<br>Bit#3: HMAC supported<br>Bit#4: CMAC supported<br>Bit#5: 64-bit short-HMAC<br>Bit#6: 80-bit short-HMAC<br>Bit#7: 96-bit short-HMAC<br>Bit#8: mandatory control plane signaling protection supported<br>Bit#9: selective control plane signaling protection supported |

Referring to Table 15, a base station can be aware that a fixed bit (Bit#8: mandatory control plane signaling protection supported) and a selective bit (Bit#9: selective control plane signaling protection supported) for supporting control plane signaling protection are further comprised in a modified MOB-BSHO-REQ message.

In response to the modified MOB-BSHO-REQ message, the same additional bits shown in Table 15 can be contained in a MOB_BSHO-RSP message sent by the base station.

II. Second Embodiment

<Selective Control Signaling Encryption Method>

In the following description, explained are methods of encrypting control signals selectively to be applicable to embodiments of the present invention.

In IEEE 802.16e system, a mobile station and a base station generate a CMAC (cipher based message authentication code) key and a HMAC (hashed message authentication code) key for the control signaling protection with an authorization key shared by both of the mobile station and the base station.

Each of the mobile station and the base station is able to generate a message authentication code (MAC) using the CMAC key and/or the HAMC key. Moreover, the mobile station and the base station are able to secure integrity of a corresponding control signal by exchanging the control signal in a manner of appending a message authentication code (MAC) to the control signal.

Meanwhile, in case that a base station and a mobile station use AES-CCM, the mobile station and the base station are able to guarantee a integrity of a corresponding control signal itself by exchanging the control signal in a manner of appending an integrity check value (ICV) to the control signal.

Even if a mobile station and a base station protect integrity of message using a CMAC key and/or a HMAC key, a message authentication code does not provide confidentiality of the corresponding message despite providing a decision for a presence or non-presence of forgery/falsification of the corresponding message. Therefore, the CMAC/HMAC key does not provide a covertness function of the corresponding message.

Moreover, the IEEE 802.16e system does not provide a covertness function for a control signal despite providing a covertness function for a general message. In particular, since a control signal is transmitted by having CMAC/HMAC appended thereto only, it may become a security threat. And, a system protection may become vulnerable to malicious attacks.

Yet, if confidentiality is uniformly provided to all control signals, it may increase a load of network and may decrease overall efficiency of system. Among currently used MAC (medium access control) header fields, there is such information necessary for the selective protection of control signaling as an EC (encryption control) field, an EKS (encryption key sequence) field, etc.

In the following descriptions for embodiments of the present invention, methods of providing confidentiality of a selective control signal using an EC filed only with a traffic encryption key (TEK) previously defined in IEEE 802.16e and methods of providing confidentiality using an EC filed and an EKS field are explained in detail.

In case that a base station and a mobile station use an EC field having prescribed bits only, the base station is able to entirely indicate whether confidentiality is provided and whether encryption is selectively performed, using the EC field only. For instance, when an EC field has a 1-bit size, if the EC field is set to '0', it indicates that a corresponding control signal is not encrypted. If the EC field is set to '1', it indicates that a corresponding control signal is selectively encrypted and also indicates that confidentiality is provided.

In case that an EC field and an EKS field are used both, the EC field can indicate whether a payload of a corresponding control signal is encrypted. In this case, the EKS field can represent an encryption level of the corresponding control signal as a key sequence.

In another aspect of the present invention, it is able to provide confidentiality of a selective control signal using a flow identifier (Flow ID) only. For instance, in case that a flow identifier indicates a transport type, a corresponding control signal (or, a management message) is not encrypted. Yet, if a flow identifier indicates a management type, the flow identifier is able to indicate that a corresponding control signal (or, a management message) is encrypted. For instance, it is able to define to use a value for a case that a flow identifier indicates a management type, a case that both encryption and integrity are simultaneously supported, or a case that both encryption and integrity are not supported.

The EC field and/or the EKS field can be changed into another field for performing the same function. Namely, the EC field and/or the EKS field can be used by having the equal meanings of all fields indicating a presence or non-presence of a control signal or being modified. Moreover, the EC field and/or the EKS field can be included in a general MAC header or a header of another control signal (or, a control message).

According to embodiments of the present invention, a flow identifier and encryption control fields can be used by being combined with each other. For instance, it is able to indicate a presence or non-presence of a selective encryption of a control signal by the combination of a flow indicator and an EC field or the combination o a flow identifier and an EKS field. In case of a transport flow identifier (FID), for example, a security association (SA) is mapped to a flow identifier and the corresponding security association is applied to all data of the corresponding flow identifier.

Yet, in case of a management flow identifier (FID), all control signals of a flow identifier, to which a corresponding SA corresponds, are not encrypted. Instead, encryption is selectively applied according to an EX field and/or an EKS field. That is, a mobile station is able to know whether a corresponding management message is encrypted by checking header information according to a type of each management message.

After an authorization phase between a base station and a mobile station has been completed, embodiments of the present invention are usable to encrypt a control signal between the base station and the mobile station selectively. In particular, selective encryption for a control signal is valid after the authorization phase has ended. In this case, each of the mobile station and the base station is able to selectively encrypt a control signal using an encryption key (e.g., TEK) negotiated each other.

For instance, an initial network entry procedure, which is performed prior to an authorization phase, is a state that a TEK is not activated. Hence, in case of the natal network entry procedure, selective encryption for a control signal is not supported. Yet, if a base station and a mobile station set up a TEK through an authorization phase, each of the base station and the mobile station is able to provide selective confidentiality for a control signal using the TEK.

Moreover, a base station and a mobile station are able to further secure message integrity by appending a message authentication code to a control signal. Yet, in case that AES-CCM (advanced encryption standard-counter mode encryption mode with cipher block chaining message authentication code) is applied to embodiments of the present invention, as the AEC-CCM is provided with message integrity protection of itself, a separate message authentication code needs not to be included.

For instance, in case that a message authentication code is included to support integrity of a control message only, it means a case that AES-CCM/AES-CTR is unused or a case that integrity of a control message needs to be supported except a case that message integrity and confidentiality fail to be simultaneously supported.

AES-CCM in encryption algorithm adopted by the wireless access technology, IEEE 802.16e standard, basically includes a self-message authentication function therein. Yet, the AES-CCM is not a common denominator for the whole encryption algorithm. In a currently-developed IEEE 802.16m system, it is preferable that a function for confidentiality guarantee is supported to enable a mobile station and a base station to safely exchange control signaling each other after an authorization phase.

Namely, a solution for preventing control signals transceived between a mobile station and a base station from being exposed without excessive load on a network is necessary. Accordingly, embodiments of the present invention disclose various methods of preventing confidentiality of a control signal from being damaged in a manner that a mobile station and a base station selectively encrypt to exchange a control signal using an encryption key (e.g., traffic encryption key (TEK)) negotiated each other.

In second embodiments of the present invention, it is unnecessary to newly define a type field and an attribute field for additional keying parameter in a PKM attribute type parameter defined in the IEEE 802.16e standard. Moreover, assume that encryption algorithm used for the control signal protection basically uses the data encryption algorithms defined in the IEEE 802.16e standard. In IEEE 802.16m standard, algorithms defined in the IEEE 802.16e standard are used entirely or in part.

CBC-IV attribute field is necessary in case that a control signal encryption algorithm identifier of 'SA Ciphersuite' is set to 0x01 (e.g., DES in CBS mode). Moreover, CBC-IV is not necessary in case that a control signal encryption algorithm identifier of SA encryption is set to 0x02 (e.g., AES). Yet, if a control signal encryption algorithm identifier of SA encryption is set to 0x03 (e.g., AES in CBC mode), CBC-IV is necessary.

Cipher suite used in the second embodiment of the present invention can refer to Table 7. Moreover, a cipher suite used in embodiments of the present invention can refer to Table 8.

In the following description, explained is a control signal encryption algorithm identifier for selectively encrypting a control signal, a control signal encryption algorithm identifier used in authenticating a control signal and a TEK encryption algorithm identifier.

Table 16 shows an example for a control signal encryption algorithm identifier format used for embodiments of the present invention. As mentioned in the foregoing description, in IEEE 802.16m standard, algorithms defined in the IEEE 802.16e standard are used entirely or in part.

TABLE 16

| value | description |
| --- | --- |
| 0 | No control signaling protection |
| 1 | CBS mode, 56-bit DES |
| 2 | CCM mode, 128 bit AES |
| 3 | CBC mode, 128 bit AES |
| 4-127 | reserved |
| 128 | CTR mode, 128 bit AES for MBS with 8 bit ROC |
| 129-255 | reserved |

Referring to Table 16, if an encryption algorithm identifier of a control signal is '0', it indicates that any kind of control signal is not protected. If an encryption algorithm identifier of a control signal is '1', it indicates a 56-bit CBC (cipher block chaining) mode. If an encryption algorithm identifier of a control signal is '2', it indicates a 128-bit CCM (CTR mode with CBC-MAC) mode. If an encryption algorithm identifier of a control signal is '3', it indicates a 128-bit CBC mode. If an encryption algorithm identifier is set to one of '4' to '127', it indicates a reserved value. If an encryption algorithm identifier is '128', it indicates a CTR (counter mode encryption) mode. Selective encryption for a control signal is performed using this individual encryption algorithm.

Table 17 shows an example of a control signal authentication algorithm identifier format used for embodiments of the present invention.

TABLE 17

| value | description |
| --- | --- |
| 0 | No control signaling authentication |
| 1 | CBS mode, 128 bit AES |
| 2-255 | Reserved |

Referring to Table 17, if a control signal authentication algorithm identifier is set to '0', authentication for any control signal is not supported. If a control signal authentication algorithm identifier is set to '1', it indicates a 128-bit CBC mode. And, the rest of bits are usable as a reserved value.

Table 18 shows an example of a TEK encryption algorithm identifier usable for embodiments of the present invention.

TABLE 18

| Value | Description |
| --- | --- |
| 0 | Reserved |
| 1 | 3-DES EDE with 128 bit key |
| 2 | RSA with 1024-bit key |
| 3 | ECB mode AES with 128 bits |
| 4 | AES key wrap with 128 bit key |
| 5-255 | Reserved |

Referring to Table 18, a value '0' or '5-255' of TEK authentication algorithm identifier indicates a reserved value. A value '1' indicates 128-bit 3-DES EDE (3-data encryption standard encrypt-decrypt-encrypt). A value '2' indicates a 1024-bit RSA. A value '3' indicates a 128-bit AES mode ECB (electronic code book). And, a value '4' indicates a 128-bit AES key wrap.

<Selective Control Signaling Encryption Support Negotiation>

In the following description, negotiation methods for encrypting a control signal selectively in a mobile station and a base station are explained.

Figure 8:
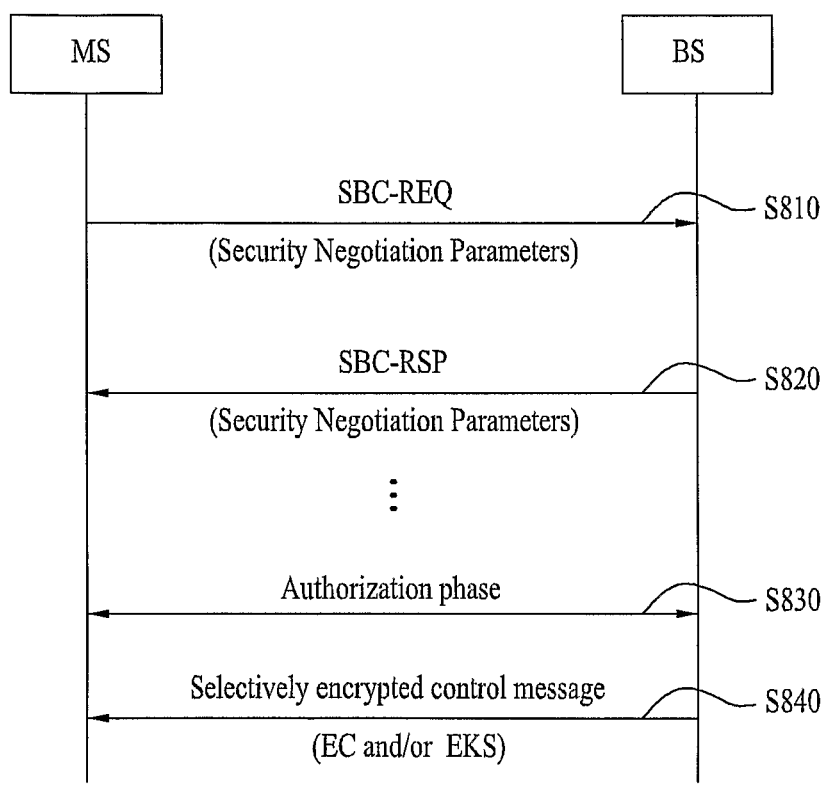
FIG. 8 is a diagram for one of selective control signal encrypting methods according to a second embodiment of the present invention.

FIG. 8 is a diagram for one of selective control signal encrypting methods according to a second embodiment of the present invention.

Referring to FIG. 8, a mobile station (MS) is able to send a message (e.g., SBC-REQ (subscriber station basic capability request) for negotiating a basic capability to a base station (BS). In this case, a sort of the message for negotiating the basic capability includes security negotiation relevant basic capability messages [S810].

In the step S810, a security negotiation parameter can be comprised in the SBC-REQ message. In this case, a message confidentiality mode field for indicating a confidentiality protection mode of a control signal supported by the mobile station can be included in the security negotiation parameter.

In the following description, a security negotiation parameter used for embodiments of the present invention is explained. Table 19 shows an example for a security negotiation parameter.

TABLE 19

| Type | Length | Value | Scope |
|---|---|---|---|
| 25 | variable | The compound field contains the sub-attributes as defined in the table below | SBC-REQ, SBC-RSP |

A security negotiation parameter can include a sub-attribute field as a compound field. Table 20 shows a sub-attribute of a security negotiation parameter.

TABLE 20

| Attribute | Contents |
|---|---|
| PKM Version Support | Version of privacy Sub-layer supported |
| Authorization Policy Support | Authorization Policy to Support |
| Message Authentication Code Mode | Message Authentication Code to support |
| Message Confidentiality Mode | Message Confidentiality to support |
| PN Window Size | Size of capability of the receiver PN window per SAID |
| PKM Flow Control | Maximum number of concurrent PKM transaction |
| Maximum Number of Supported Security Association | Maximum number of supported SA |

Referring to Table 20, security negotiation parameters can include a PKM version support parameter, an authorization policy support parameter, a message authentication code mode parameter, a message confidentiality mode parameter, a PN window size parameter, a PKM flow control parameter and a parameter of a maximum number of supported security association.

In this case, the message confidentiality mode parameter indicates a control message confidentiality supportable in a current wireless access system.

Table 21 shows an example of a PKM version support parameter format.

TABLE 21

| Type | Length | Value |
|---|---|---|
| 25.1 | 1 | Bit 0: PKM version 1<br>Bit 1: PKM version 2<br>Bit 2: PKM version 3<br>Bits 3-7: Reserved, shall be set to zero |

Referring to Table 21, embodiments of the present invention assume a case that a PKM version 3 is supported. Yet, a PKM version 2 or a PKM version 1 is available as well as the PKM version 3. In particular, in the PKMv3, referring to Table 21, it is able to clearly express whether a selective confidentiality protection for a control signal is supported, using a message confidentiality mode.

Table 22 shows an example for a message confidentiality mode field format used for the step S810.

TABLE 22

| Type | Length | Value |
|---|---|---|
| 25.7 | 1 | Bit 0: No Message Confidentiality<br>Bit 1: Selective Message Confidentiality<br>Bits 2-7: Reserved. Shall be set to zero |

Referring to Table 22, if a message confidentiality mode parameter is set to '0', it indicates that a message confidentiality mode is not supported. If a message confidentiality mode parameter is set to '1', it indicates that a message confidentiality mode is selectively supported.

A mobile station is able to support at least one or more confidentiality protection modes. The mobile station is able to inform a base station of a message confidentiality mode supportable by the mobile station in a manner of sending a SBC-REQ message to the base station, as performed in the step S810.

Referring now to FIG. 8, the base station has received the SBC-REQ message and is then able to negotiate a security negotiation capability with the mobile station by sending an SBC-RSP message containing the a security negotiation parameter supportable by the base station. In particular, in a step S820, the base station is able to negotiate a message confidentiality mode with the mobile station by transmitting a security negotiation parameter including a message confidentiality mode field to the mobile station [S820].

In FIG. 8, after completing the basic capability negotiation, the mobile station and the base station are able to perform an authorization phase [S830].

Through the authorization phase, each of the mobile station and the base station is able to generate a TEK for a selective protection for a control signal.

The base station is able to selectively encrypt a control message with the TEK generated through the authorization phase based on the message confidentiality mode negotiated with the mobile station. Moreover, the base station is able to send the selectively encrypted control message to the mobile station [S840].

The mobile station is also able to selectively encrypt a control message based on the message confidentiality mode negotiated with the base station. Moreover, the mobile station is able to send the selectively encrypted control message to the base station as well.

Figure 9:
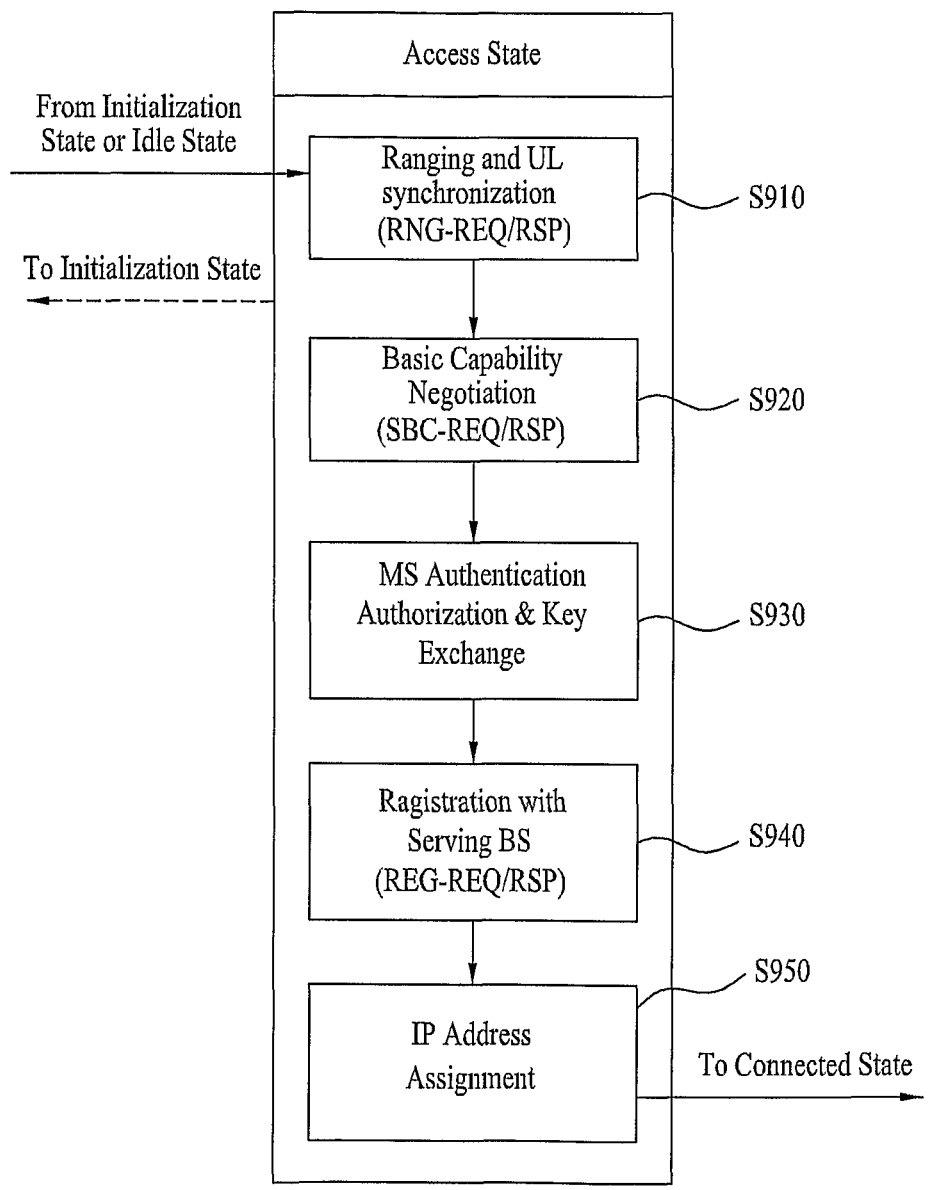
FIG. 9 is a diagram for another one of selective control signal encrypting methods according to a second embodiment of the present invention.

FIG. 9 is a diagram for another one of selective control signal encrypting methods according to a second embodiment of the present invention.

FIG. 9 shows an access state of a mobile station in the course of performing a negotiation for protecting a control signal selectively.

Referring to FIG. 9, a mobile station is able to enter an access state from an initialization state or an idle state. In this case, the mobile station performs a ranging procedure with a base station and is then able to obtain an uplink synchronization [S910].

The mobile station performs a basic capability negotiation with the base station [S920] and is then able to perform authentication and key exchange with the base station [S930]. After completion of the authentication procedure with the base station, the mobile station is able to make a registration with the corresponding base station [S940]. Moreover, the mobile station obtains an IP address from the base station [S950]. In FIG. 9, the negotiation of selective control signaling encryption between the base station and the mobile station can be performed in the step S910 or the step S920.

Figure 10:
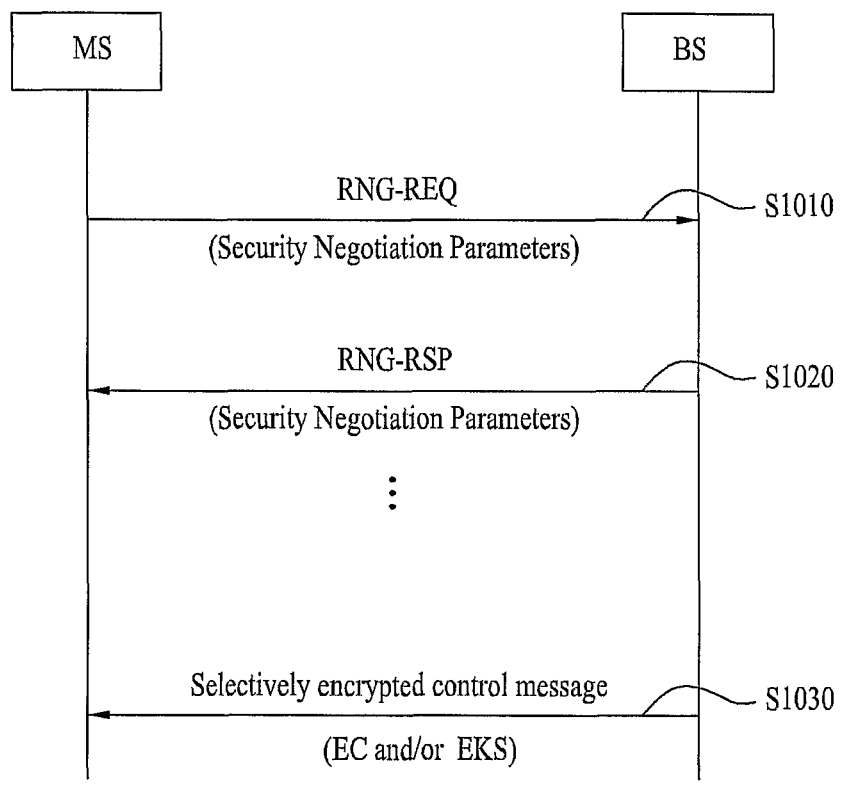
FIG. 10 is a diagram for a further one of selective control signal encrypting methods according to a second embodiment of the present invention.

FIG. 10 is a diagram for a further one of selective control signal encrypting methods according to a second embodiment of the present invention.

First of all, a capability negotiation for a selective control signaling encryption method can be performed by a base station and a mobile station in an idle mode as well. In case that the mobile station in idle mode moves away into another base station and if a prescribed location update condition is met, the mobile station is able to perform a location update with the base station. In doing so, the mobile station is able to perform a selective confidentiality protection negotiation for a control signal with the base station.

Referring to FIG. 10, a mobile station in idle mode is able to send a ranging request message containing a security negotiation parameter to a base station [S1010].

It the base station receives the ranging request message containing the security negotiation parameter therein, it is able to send a ranging response message containing a security negotiation parameter supportable by the base station to the mobile station [S1020].

The security negotiation parameters used for the step S1010 and the step S1020 can refer to the descriptions for Tables 19 to 22. Hence, a message confidentiality mode field indicating a confidentiality protection mode of a control signal supportable by the mobile station can be included in the security negotiation parameter in the step S1010. And, a message confidentiality mode field indicating a confidentiality protection mode of a control signal supportable by the base station can be included in the security negotiation parameter in the step S1020.

After completion of the selective confidentiality protection negotiations for control signaling in the step S1010 and the step S1020, the base station is able to send a selectively encrypted control message to the mobile station [S1030].

The mobile station decodes a header of the control signal received in the step S1030 and is then able to know whether the corresponding control signal is encrypted or not. In particular, the mobile station is able to confirm whether the corresponding control message is encrypted in a manner of checking an EC field and/or an EKS field of the control signal header and a flow ID field.

Moreover, the mobile station is able to selectively encrypt a control message based on the message confidentiality mode negotiated with the base station. The mobile station is then able to send the selectively encrypted control message to the base station. In this case, a TEK, which is used for the selective confidentiality support of the control signal, can include a TEK that is newly generated when the mobile station performs the location update on a target base station.

Figure 11:
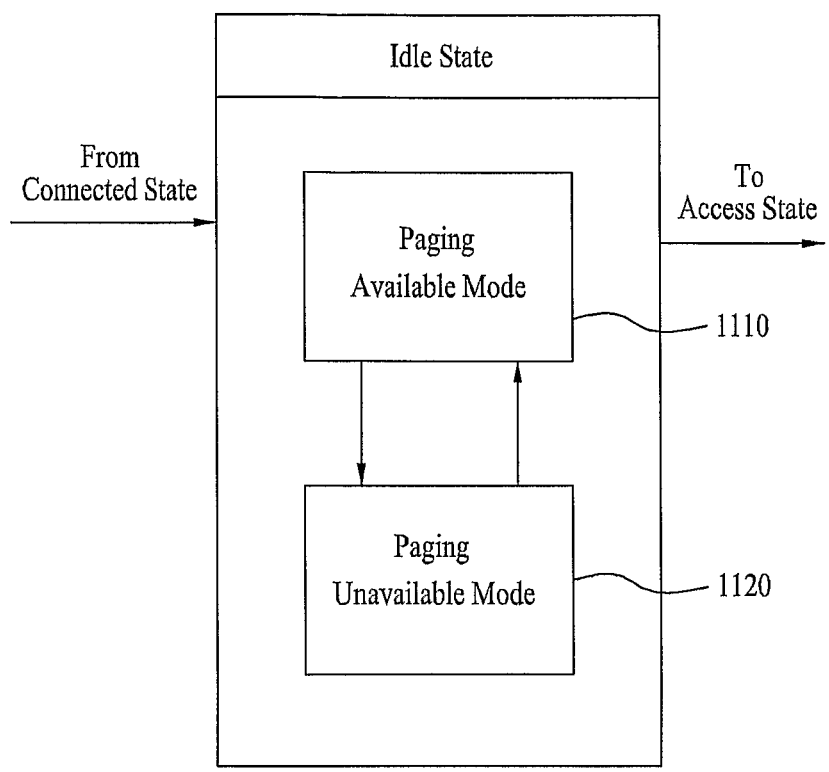
FIG. 11 is a diagram for a method of negotiating a selective control signal encrypting scheme, when a mobile station in idle mode performs a location update, according to a second embodiment of the present invention.

FIG. 11 is a diagram for a method of negotiating a selective control signal encrypting scheme, when a mobile station in idle mode performs a location update, according to a second embodiment of the present invention.

Referring to FIG. 11, a mobile station is able to enter a state of an idle mode if a prescribed condition is met in a state connected to a base station. An idle state can be mainly categorized into a paging available mode and a paging unavailable mode. In this case, the paging available mode indicates a paging listening interval for a mobile station to receive a paging message from a base station. And, the paging unavailable mode indicates a case that a mobile station is in a sleep mode (or. Idle mode).

The mobile station in the idle mode state exchanges a ranging request message and a ranging response message with the base station in the course of a location update and is then able to negotiate whether a selective control signal protection is supported (referring to FIG. 10).

Moreover, the idle-mode mobile station, as shown in FIG. 11, is able to negotiate a presence or non-presence of a selective protection of a control signal with the base station through a paging message (e.g., MOB_PAG-ADV) that is sent periodically or with a prescribed interval in a paging available mode. In particular, a message confidentiality mode for a selective confidentiality support for a control signal can be contained in the periodical paging message.

Yet, in the case shown in FIG. 11, the mobile station is configured to uni-directionally receive information on a presence or non-presence of an encryption-available control signal protection support from the base station.

According to embodiments of the present invention, if encryption is performed to provide confidentiality for all control signals uniformly, overall network load is considerably increased or overall system efficiency may be reduced. Therefore, according to embodiments of the present invention, encryption is applicable to prescribed control signals only.

Information necessary for a selective protection of a control signal among MAC (medium access control) header fields is an encryption control (EC) field. The EC field (and/or an encryption key sequence (EKS) field) can clearly express whether a payload will be encrypted.

A type of a flow identifier (ID) can indicate whether a corresponding message is in transport more or management mode. If a value for a case that a flow identifier represents a management type, a value for a case that both encryption and integrity are simultaneously supported, a value for a case that integrity is supported only, or a value for a case that both encryption and integrity are not supported, can be defined to use.

For instance, a mobile station checks an EC field included in a header of a control signal and is then able to be aware whether the corresponding control signal is encrypted. In addition, a mobile station can be aware whether a corresponding control signal is encrypted, using a combination of an EC field and an EKS field. A base station is able to indicate whether a corresponding control signal is encrypted, using a combination of an EC field and a flow identifier. And, a base station is able to indicate whether a corresponding control signal is encrypted, using a flow identifier according to a message type.

Namely, a mobile station checks at least one of an EC field, an EKS field and a message type of a flow identifier and is then able to be aware of a presence or non-presence of an encryption support. For instance, in the step S840 shown in FIG. 8 or the step S1030 shown in FIG. 10, the mobile station is able to receive a selectively encrypted control signal. In this case, the mobile station checks the EC field in the MAC header of the control signal and is then able to confirm whether the control signal is encrypted. Alternatively, according to another embodiment, it is able to check a level of encryption or whether a corresponding control signal is encrypted, using a combination of an EC field and an EKS field or using a flow identifier (FID).

The message confidentiality mode negotiation methods described with reference to FIGS. 8 to 11 can be also performed in case that a mobile station performs handover into a target base station. For instance, a mobile station and a target base station is able to negotiate whether to encrypt a control signal using a handover message. In particular, the mobile station and the target base station are able to negotiate a message confidentiality mode using a handover request/response (HO-RSQ/RSP) message. And, message confidentiality mode relevant information on a specific terminal can be delivered to a target base station from a serving base station via a backbone message.

<Selective Control Signal Encryption Method>

In the following description, methods of encrypting a control signal selectively are explained. Control signal encrypting methods are applicable to a case of encrypting a control signal after a mobile station and a base station have negotiated selective encryption.

Figure 12:
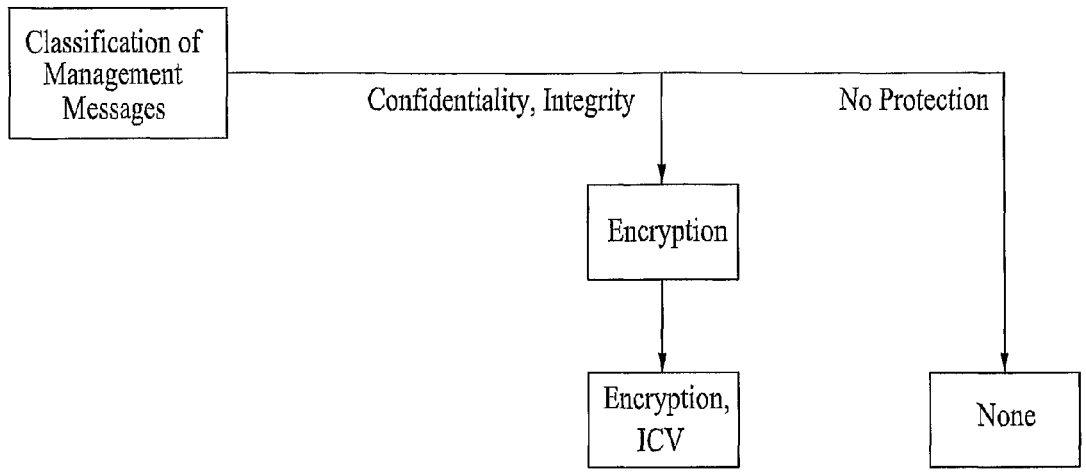
FIG. 12 is a diagram for one of methods of selectively encrypting a control signal according to a second embodiment of the present invention.

FIG. 12 is a diagram for one of methods of selectively encrypting a control signal according to a second embodiment of the present invention.

FIG. 12 assumes a case that a mobile station and a base station use AES-CCM as encryption algorithm. In case that a mobile station and a base station use AES-CCM, it is able to provide integrity and confidentiality of a corresponding management message both using the AES-CCM algorithm.

FIG. 12 shows whether a selective encryption is applied to a corresponding management message according to an EC field, an EKS field or a message type of a flow identifier (ID) in a MAC header. For instance, if an EC field is set to '1', it indicates that encryption is performed for a confidentiality protection for a corresponding management message and it also indicates that ICV is appended for integrity protection.

In this case, in order to protect confidentiality of a management message, a base station is able to append ICV for an integrity protection after having encrypted a payload. That is, a base station performs encryption of the management message for a confidentiality protection and is then able to append an ICV field after the encrypted payload of the management message for an integrity protection.

If an EC field is set to '0', it indicates that a selective encryption is not applied to a corresponding control signal.

Figure 13:
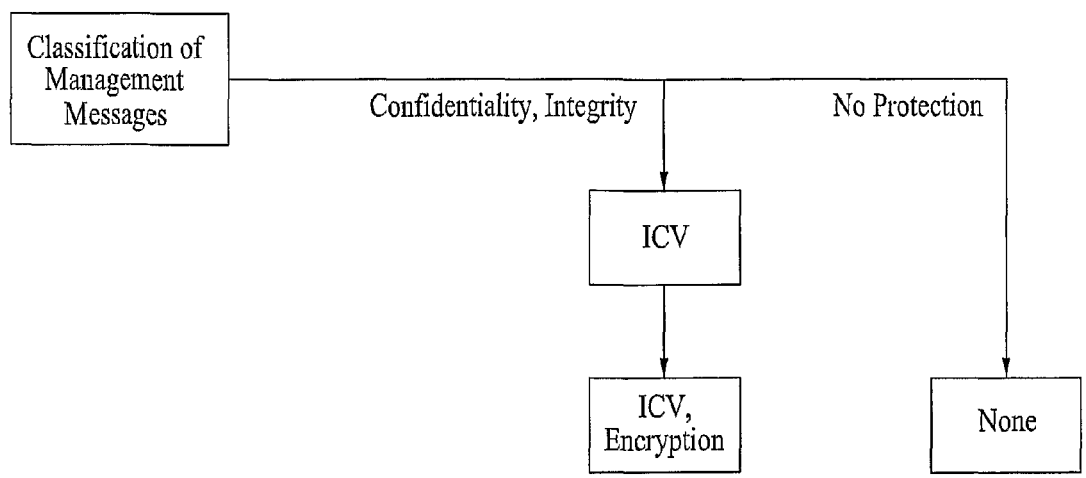
FIG. 13 is a diagram for another example of methods of selectively encrypting a control signal according to a second embodiment of the present invention.

FIG. 13 is a diagram for another example of methods of selectively encrypting a control signal according to a second embodiment of the present invention.

A case shown in FIG. 13 is similar to that shown in FIG. 12. Yet, FIG. 13 differs from FIG. 12 in sequence of encryption for confidentiality protection and ICV appending for integrity protection when a selective encryption is applied to a corresponding management message.

Referring to FIG. 13, a base station appends an ICV to a payload to protect integrity of a management message and is then able to encrypt the payload and the ICV of the management message to protect confidentiality of the management message. In particular, the base station appends the ICV to the management message for an integrity protection and is then able to encrypt the payload and the ICV for a confidentiality protection.

In FIG. 12 or FIG. 13, as a method of indicating whether a control signal is encrypted, a bit for instructing a presence or non-presence of encryption is used for a header of the corresponding control signal. In particular, a base station is able to indicate whether a corresponding control signal is encrypted, using an EC field contained in a MAC header.

Yet, in another aspect of the present invention, it is able to use an EC field and an EKS field together. In this case, the EC field indicates whether a corresponding control signal is encrypted. And, the EKS field is able to indicate an encryption level of a corresponding control signal or an encryption sequence of a corresponding control signal. For instance, if an EKS field is set to '00', it indicates that a corresponding control signal is not encrypted. If an EKS field is set to one of '01', '10' and '11', it indicates that a corresponding control signal is encrypted and also indicates that an ICV is appended. And, a base station is able to indicate the sequence of encryption and ICV appending using an EKS field.

In another aspect of the present invention, it is able to use a message type of a flow identifier. In particular, a value for a case that a message type of a flow identifier indicates a management type, a value for a case that encryption and integrity are simultaneously supported, a value for a case that integrity is supported only, or a value for a case that both encryption and integrity are not supported is defined for a selective control signal encrypting method to use.

Figure 14:
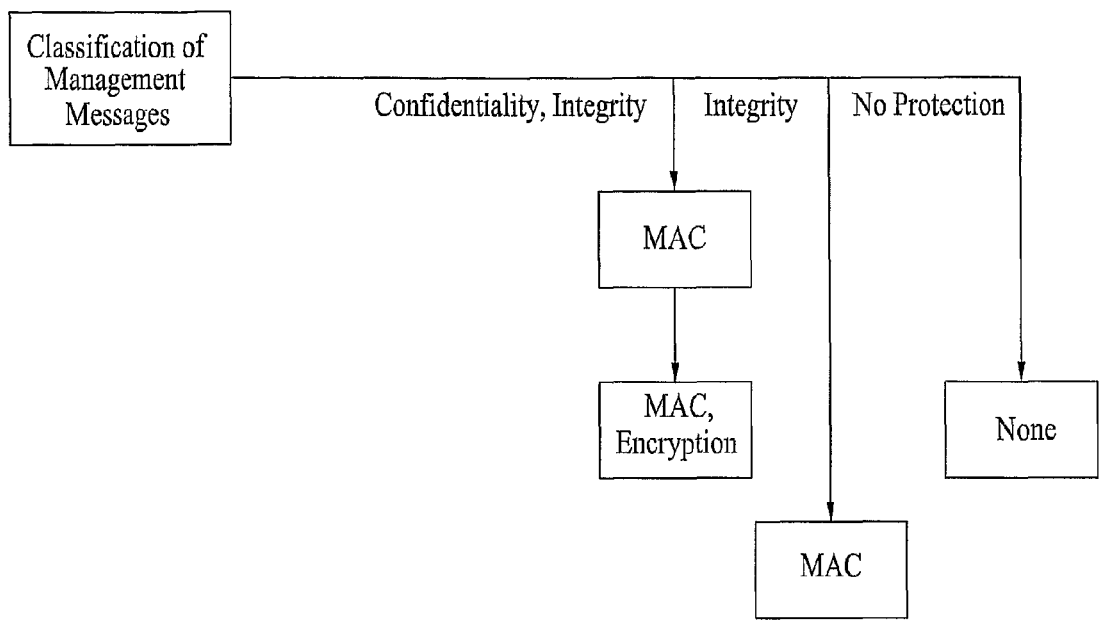
FIG. 14 is a diagram for one of methods of selectively encrypting a control signal according to a second embodiment of the present invention.

FIG. 14 is a diagram for one of methods of selectively encrypting a control signal according to a second embodiment of the present invention.

FIG. 14 shows a case that AES-CCM algorithm is used for encryption (or, AES-CTR (advanced encryption standard counter mode encryption) algorithm can be selectively used).

A base station is able to protect integrity by appending a message authentication code (MAC) to a signal or a message in case of using the AES-CCM algorithm.

As mentioned in the foregoing description, a case of including a message authentication code only to support integrity of a message only may mean a case that integrity of a message is necessary only except a case that AES-CCM/AES-CTR is unused or a case that message integrity and confidentiality are not simultaneously supported.

Referring to FIG. 14, a base station is able to protect confidentiality by selectively encrypting a management message and/or integrity by appending a message authentication code (e.g. CMAC).

For instance, if an EC field of a header is set to '1', integrity is protected by appending a message authentication code to a corresponding management message and confidentiality can be protected by encrypting the corresponding management message using the AES-CCM algorithm.

In this case, the base station first appends a message authentication code to protect integrity of a management message and is then able to encrypt a payload and the message authentication code of the management message to protect confidentiality of the corresponding management message. In particular, the base station first appends the message authentication code (e.g. CMAC) for the integrity protection and is then able to encrypt the payload and the message authentication code together for the confidentiality protection.

If an EC field of a header is set to '0', the base station does not encrypt a corresponding management message but is able to indicate that integrity is protected my appending a message authentication code (MAC). In case of a control signal classified as a fact that a selective encryption is not applied in FIG. 14, any protection may not be performed.

Yet, in another aspect of the present invention, it is able to use an EC field and an EKS field together. In this case, the EC field indicates whether a corresponding control signal is encrypted or not. And, the EKS field is able to indicate an encryption level of a corresponding control signal or an encryption sequence of a corresponding control signal.

For instance, if an EKS field is set to '00', it indicates that a corresponding control signal is not encrypted but integrity is protected only. That is, CMAC tuple is included to the end of the management message. CMAC integrity protects only payload of the management message, not header part.

If an EKS field is set to one of '01', '10' and '11', it indicates that a message authentication code (e.g. CMAC) is appended and then a corresponding management message comprising the CMAC tuple is encrypted.

Figure 15:
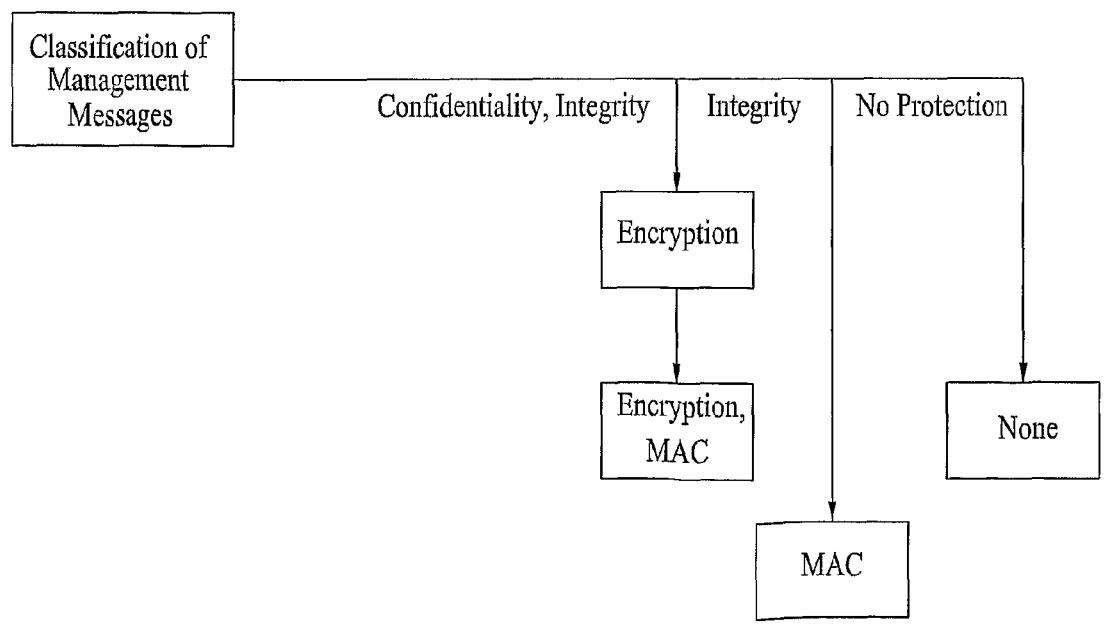
FIG. 15 is a diagram for another one of methods of selectively encrypting a control signal according to a second embodiment of the present invention.

FIG. 15 is a diagram for another one of methods of selectively encrypting a control signal according to a second embodiment of the present invention.

A case shown in FIG. 15 is similar to that shown in FIG. 14. Yet, FIG. 15 differs from FIG. 14 in sequence of encryption for confidentiality protection and MAC (message authentication code) appending for integrity protection when a selective encryption is applied to a corresponding management message. In the second embodiment of the present invention, a mobile station (or, AMS) and a base station (or, ABS) can be know whether the selective confidentiality protection is applied or not through capability negotiation.

Referring to FIG. 15, if an EC field of medium access header is set to '1', the base station first encrypts a payload of a management message to protect confidentiality of the management message and is then able to append a message authentication code (MAC) to the payload of the management message to protect integrity of the management message.

Namely, the base station first encrypts the management message for the confidentiality protection and is then able to append the message authentication code to the encrypted payload for the integrity protection.

In FIG. 14 or FIG. 15, as a method of indicating whether a control signal is encrypted, a base station is able to indicate whether a corresponding control signal is encrypted, using an EC field contained in a MAC (medium access control) header.

Yet, in another aspect of the present invention, it is able to use an EC field and an EKS field together. In this case, the EC field indicates whether a corresponding control signal is encrypted or not. And, the EKS field is able to indicate an encryption level of a corresponding control signal or an encryption sequence of a corresponding control signal.

For instance, if an EKS field is set to '00', it indicates that a corresponding control signal is not encrypted but integrity is protected only. That is, CMAC tuple is included to the end of the management message. CMAC integrity protects only payload of the management message, not header part.

If an EKS field is set to one of '01', '10' and '11', it indicates that a corresponding management message (control signal) is encrypted and then a message authentication code (e.g. CMAC) is appended. In this case, MAC field is included after encrypted payload and this ICV integrity protects both payload of the management message and MAC header part.

In addition, a base station is able to indicate the sequence of the encryption and the message authentication code appending using a combination of bits of the EKS field.

In another aspect of the present invention, it is able to use a message type of a flow identifier. In particular, a value for a case that a message type of a flow identifier indicates a management type, a value for a case that encryption and integrity are simultaneously supported, a value for a case that integrity is supported only, or a value for a case that both encryption and integrity are not supported is defined for a selective control signal encrypting method to use.

<Control Signal Classifying Method>

According to embodiments of the present invention, specific control signals can be selectively encrypted instead of encrypting all control signals. For instance, only if a type of a flow identifier (Flow ID Type) indicates a management message (i.e. specific control signal), a selective encryption is applied according to an individual control signal type within the same flow identifier. In this case, a management type of a message type of the flow identifier can indicate a case that encryption and integrity are simultaneously supported in case of control signal encryption, a case that integrity is supported only or a case that both encryption and integrity are not supported.

According to embodiments of the present invention, a type of a control signal, to which a selective encryption is applied, can be classified according to whether CMAC is included. Moreover, the selective encryption is applicable according to a timing point of using a corresponding control signal. In particular, the selective encryption is not applied to control signals used for an initial network entry procedure prior to an authentication procedure. Moreover, in a connected state after an authentication procedure, a control signal exchanged with a serving base station can be encrypted in case of handover but a control signal exchanged with a target base station is unable to be encrypted.

Meanwhile, in a network re-entry procedure, the selective encryption for control messages is not supported in a manner similar to that of the initial network entry. In case of providing a self-message authentication function like the AES-CCM algorithm, encryption and message authentication are simultaneously performed. Therefore, a base station is not necessary to add CMAC/HMAC to a specific control signal.

Yet, even if the AES-CCM is used, if confidentiality of a message is unnecessary, integrity can be provided with the appending of CMAC only. Since other encryption algorithms disclosed in the standards of wireless access systems do not include a message authentication function, the application of the corresponding encryption algorithm and the addition of CMAC/HAMC need to be separately performed.

Meanwhile, if an EC field is set to '0' or an EKS field is set to '00', it indicates that a message authentication code is appended to a control signal, which needs no encryption, to protect integrity only or that any protection is not supported. In this case, control signals, for which any protection is not supported, indicate all control signals failing to contain CMAC.

Table 23 shows types of MAC management messages (or, MAC control signals) to which CMAC Tuple needs to be added.

TABLE 23

| Type | Length Value | Scope |
| --- | --- | --- |
| 141 | 13 or 19 | DSx-REQ/RSP/ACK, REG-REQ/RSP, RES-CMD, DREG-CMD/REQ, TFTP-CPLT, MOB_SLP-REQ/RSP, MOB_SCN-REQ/RSP, MOB_BSHO-REQ/RSP, MOB_MSHO-REQ, MOB_HO-IND, MOB_MIH-MSG, RNG-REQ/RSP, SBC-REQ/RSP |

Referring to Table 23, it is able to observe types of MAC management messages to which CMAC Tuple can be appended. In particular, it is ale to check MAC messages, to which the selective encryption for control signaling is applied, according to embodiments of the present invention. Therefore, a base station is able to selectively perform the encryption on control signals shown in Table 10.

Table 24 shows CMAC Tuple value fields applied to embodiments of the present invention.

TABLE 24

| Field | Length | Notes |
| --- | --- | --- |
| reserved | 4 bits | Set to 0 |
| Key Sequence Number | 4 bits | AK sequence number |
| BSID | 48 bits | Only used in case of MOHO zone-optional |
| CMAC Packet Number Counter, CMAC_PN_* | 32 bits | This context is different UL, DL CMAC with AES-128 |
| CMAC value | 64 bits | |

Referring to Table 23 and Table 24, the application of authentication Tuple is limited to several management control signals. And, the management control signals protected by CMAC Tuple can be limited to several MAC messages.

For instance, among MAC management messages, for which integrity should be protected through CMAC-based authentication Tuples, the MAC management messages necessary to be encrypted can be discriminated from other MAC management messages unnecessary to be encrypted. In particular, among the control signals defined in the 16e, control signals, to which CMAC Tuple is not appended, may not be basically encrypted. Among CMAC Tuple appended control signals, messages related to ranging, handoff, reset command, MIH and TFTP may not be encrypted bit other messages related to registration, PKM, basic capability negotiation, idle mode entry, dynamic service generation, handoff request, and scanning request may be encrypted. According to embodiments of the present invention, whether to apply encryption can vary according to a type of a control signal, a timing point of using an individual control signal, or the like.

Table 25 shows an example for controls signals encrypted by having HMAC Tuple applied thereto and control signals to which HMAC Tuple is not applied.

TABLE 25

| Scope | Encryption shall be supported | Encryption shall be not supported |
|---|---|---|
| DSx-REQ/RSP/ACK, REG-REQ/RSP, RES-CMD, DREG-CMD/REQ, TFTP-CPLT, MOB_SLP-REQ/RSP, MOB_SCN-REQ/RSP, MOB_BSHO-REQ/RSP, MOB_MSHO-REQ, MOB_HO-IND, MOB_MIH-MSG | DSx-REQ/RSP/ACK, REG-REQ/RSP, DREG-CMD/REQ, MOB_SLP-REQ/RSP, MOB_SCN-REQ/RSP, MOB_BSHO-REQ/RSP, MOB_MSHO-REQ, MOB_HO-IND | RES-CMD, TFTP-CPLT, MOB_MIH-MSG |

Referring to Table 25, it is able to check a control signal necessary to be encrypted and a control signal unnecessary to be encrypted among MAC management messages, of which integrity is protected, according to whether HMAC is included.

Table 26 shows an example for controls signals encrypted by having CMAC Tuple applied thereto and control signals to which CMAC Tuple is not applied.

TABLE 26

| Scope | Encryption shall be supported | Encryption shall be not supported |
|---|---|---|
| DSx-REQ/RSP/ACK, REG-REQ/RSP, RES-CMD, DREG-CMD/REQ, TFTP-CPLT, MOB_SLP-REQ/RSP, MOB_SCN-REQ/RSP, MOB_BSHO-REQ/RSP, MOB_MSHO-REQ, MOB_HO-IND, MOB_MIH-MSG, RNG-REQ/RSP, SBC-REQ/RSP | DSx-REQ/RSP/ACK, REG-REQ/RSP, DREG-CMD/REQ, MOB_SLP-REQ/RSP, MOB_SCN-REQ/RSP, MOB_BSHO-REQ/RSP, MOB_MSHO-REQ, MOB_HO-IND, RNG-REQ/RSP, SBC-REQ/RSP | RES-CMD, TFTP-CPLT, MOB_MIH-MSG |

Referring to Table 26, it is able to check a control signal necessary to be encrypted and a control signal unnecessary to be encrypted among MAC management messages, of which integrity is protected, according to whether CMAC is included.

Table 27 shows an example for controls signals encrypted by having short HMAC Tuple applied thereto and control signals to which short HMAC Tuple (or, short CMAC Tuple) is not applied.

TABLE 27

| Scope | Encryption shall be supported | Encryption shall be not supported |
|---|---|---|
| MOB_SLP-REQ/RSP, MOB_SCN-REQ/RSP, MOB_BSHO-REQ/RSP, MOB_MSHO-REQ, MOB_HO-IND, RNG-REQ/RSP, SBC-REQ/RSP, PKM-REQ/RSP | MOB_SLP-REQ/RSP, MOB_SCN-REQ/RSP, MOB_BSHO-REQ/RSP, MOB_MSHO-REQ, MOB_HO-IND, RNG-REQ/RSP | PKM-REQ/RSP |

Referring to Table 27, it is able to check a control signal necessary to be encrypted and a control signal unnecessary to be encrypted among MAC management messages, of which integrity is protected, according to whether short HMAC (or, short CMAC Tuple) is included.

As mentioned in the foregoing description, according to embodiments of the present invention, a prescribed control signal (or, a MAC management message) can be selectively encrypted. In particular, a classification for encrypted control signals is needed. Therefore, a base station and a mobile station are able to classify a control signal (or, a MAC management message) by referring to Tables 23 to 27.

According to another embodiment of the present invention, a transmitter and a receiver, which are able to perform the above embodiments of the present invention described with reference to FIGS. 5 to 15, are explained in the following description.

A mobile station (e.g. advanced mobile station) works as a transmitter in uplink or is able to work as a receiver in downlink. A base station (e.g. advanced base station) works as a receiver in uplink or is able to work as a transmitter in downlink. That is, each of the mobile station and the base station includes a transmitter and a receiver for transmission of information and/or data.

Each of the transmitter and the receiver can include a processor, a module, a part and/or a means for performing embodiments of the present invention. In particular, each of the transmitter and the receiver can include a module (means) for encrypting a message, a module for interpreting the encrypted message, an antenna for transceiving the message and the like.

A mobile station used for embodiments of the present invention can include a low-power RF/IF (radio frequency/ intermediate frequency) module. And, the mobile station can include means, modules, parts and/or the like for performing a controller function for performing the above-described embodiments of the present invention, a MAC (medium access control) frame variable control function according to a service characteristic and electric wave environment, a handover function, an authentication and encryption function, a packet modulation/demodulation function for data transmission, a fast packet channel coding function, a real-time modem control function, and the like.

A base station is able to transmit data received from an upper layer to a mobile station. The base station can include a low-power RF/IF (radio frequency/intermediate frequency) module. And, the base station can include means, modules, parts and/or the like for performing a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function, and the like.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invention is applicable to various wireless access systems. And, 3GPP ($3^{rd}$ generation partnership project), 3 GPP2 and/or IEEE 802.xx (institute of electrical and electronic engineers 802) system and the like are examples for the various wireless access systems. Embodiments of the present invention are applicable to all technical fields having the various wireless access systems applied thereto as well as the various wireless access systems.

What is claimed is:

1. A method of selectively protecting a medium access control (MAC) control message, the method comprising:
    configuring, at a transmission end, a header comprising indication information representing whether the MAC control message is encrypted;
    performing, at the transmitting end, protection of the MAC control message by selecting one scheme of plural schemes for protecting the MAC control message based on a message type of the MAC control message and a timing point of using the MAC control message; and
    transmitting, by the transmission end to a reception end, the MAC control message comprising the header,
    wherein the plural schemes for protecting the MAC control message comprise:
a first scheme that protects a confidentiality and an integrity of the MAC control message,
    a second scheme that protects only the integrity of the MAC control message, and a third scheme providing no protection of the MAC control message, and wherein the third scheme is selected when initial ranging request procedures are performed, and the first scheme is selected when registration procedures are performed after the initial ranging request procedures.

2. The method according to claim 1, wherein the indication information is a flow identifier (FID).

3. The method according to claim 1, wherein the integrity of the MAC control message by the first scheme is protected before the confidentiality is protected by the first scheme.

4. The method according to claim 1, wherein the integrity of the MAC control message is protected by the first scheme before encrypting a payload of the MAC control message and an integrity check value (ICV) for the integrity provided by the first scheme.

5. The method according to claim 4, wherein the first scheme is performed based on an AES-CCM (Advanced Encryption Standard-Counter mode encryption mode with Cipher block chaining Message authentication code) algorithm.

6. The method according to claim 4,
    wherein the integrity provided by the first scheme is protected by appending the ICV to an end of the payload, and
    wherein the integrity provided by the second scheme is protected by a CMAC (Cipher based Message Authentication Code) to an end of the payload.

7. The method according to claim 1, wherein the transmission end is a mobile station and the reception end is a base station in uplink, and the transmission end is the base station and the reception end is the mobile station in downlink.

8. The method according to claim 1, wherein the MAC control message is used by a peer-to-peer protocol of MAC layers in a mobile station and a base station to perform control plane functions.

9. An apparatus for selectively protecting a medium access control (MAC) control message, the apparatus comprising:
    a transmission unit adapted to transmit the MAC control message; and
    a processor adapted to protect the MAC control message, wherein the apparatus is adapted to
        configure a header comprising indication information representing whether the MAC control message is encrypted;
        perform protection of the MAC control message by selecting one scheme of plural schemes for protecting the MAC control message based on a message type of the MAC control message and a timing point of using the MAC control message; and
        transmit the MAC control message comprising the header, and
    wherein the plural schemes for protecting the MAC control message comprise:
        a first scheme that protects a confidentiality and an integrity of the MAC control message,
        a second scheme that protects only the integrity of the MAC control message, and
        a third scheme providing no protection of the MAC control message, and
    wherein the third scheme is selected when initial ranging request procedures are performed, and the first scheme is selected when registration procedures are performed after the initial ranging request procedures.

10. The apparatus according to claim 9, wherein the indication information is a flow identifier (FID).

11. The apparatus according to claim 9, wherein the integrity of the MAC control message is protected by the first scheme before the confidentiality is protected by the first scheme.

12. The apparatus according to claim 9, wherein the integrity of the MAC control message is protected by the first scheme before encrypting a payload of the MAC control message and an integrity check value (ICV) for the integrity provided by the first scheme.

13. The apparatus according to claim 12, wherein the first scheme is performed based on an AES-CCM (Advanced Encryption Standard-Counter mode encryption mode with Cipher block chaining Message authentication code) algorithm.

14. The apparatus according to claim 12,
wherein the integrity provided by the first scheme is protected by appending the ICV to an end of the payload, and
wherein the integrity provided by the second scheme is protected by a CMAC (Cipher based Message Authentication Code) to an end of the payload.

15. The apparatus according to claim 9, wherein the apparatus is a mobile station in uplink, and the apparatus is the base station in downlink.

16. The apparatus according to claim 9, wherein the MAC control message is used by a peer-to-peer protocol of MAC layers in a mobile station and a base station to perform control plane functions.

* * * * *